US 7,557,458 B2
(12) United States Patent
Yamamoto et al.

(10) Patent No.: US 7,557,458 B2
(45) Date of Patent: Jul. 7, 2009

(54) SOUNDPROOF TYPE ENGINE GENERATOR

(75) Inventors: Masanobu Yamamoto, Shizuoka-ken (JP); Hidenori Takahashi, Shizuoka-ken (JP)

(73) Assignee: Yamaha Motor Power Products Kabushiki Kaisha, Shizuoka-ken (JP)

( * ) Notice: Subject to any disclaimer, the term of this patent is extended or adjusted under 35 U.S.C. 154(b) by 223 days.

(21) Appl. No.: 11/775,825

(22) Filed: Jul. 10, 2007

(65) Prior Publication Data

US 2008/0238221 A1 Oct. 2, 2008

(30) Foreign Application Priority Data

Apr. 2, 2007 (JP) ............................. 2007-096746

(51) Int. Cl.
- *H02P 9/04* (2006.01)
- *F03D 9/00* (2006.01)
- *F02B 63/04* (2006.01)
- *H02K 7/18* (2006.01)
- *H02K 5/00* (2006.01)
- *F02B 63/00* (2006.01)
- *F01P 1/02* (2006.01)
- *H05B 7/11* (2006.01)
- *B23K 9/10* (2006.01)

(52) U.S. Cl. .......................... 290/55; 290/1 A; 322/1; 123/2; 123/41.7; 219/133

(58) Field of Classification Search ............... 290/1 A, 290/55; 322/1; 123/2, 41.7; 219/133

See application file for complete search history.

(56) References Cited

U.S. PATENT DOCUMENTS 2,177,686 A * 10/1939 Bracken et al. .......... 123/41.49

(Continued)

FOREIGN PATENT DOCUMENTS

JP 2006-188980 7/2006

(Continued)

OTHER PUBLICATIONS

U.S. Appl. No. 11/775,838, filed Jul. 10, 1007, Yamamoto et al.

*Primary Examiner*—Nicholas Ponomarenko
*Assistant Examiner*—Pedro J Cuevas
(74) *Attorney, Agent, or Firm*—Knobbe, Martens, Olson & Bear, LLP

(57) ABSTRACT

A soundproof type engine generator has a first external air inlet and a second external air inlet formed on a soundproof case K. A first cooling passage guides external air drawn in through the first external air inlet through a duct to a first fan, then from the first fan to a generator and discharges the air out of the soundproof case K. A second cooling passage guides external air drawn in through the second external air inlet to an engine using a second fan and then discharges the air out of the soundproof case The first fan is made up of a disk-like planar part, a plurality of first blades and a plurality of second blades, respectively provided radially on both head and tail sides of the planar part. External air drawn with the plurality of first blades through the first external air inlet is guided through the duct to the generator, and discharged out of the soundproof case. Air in the soundproof case is discharged with the plurality of second blades out of the soundproof case. The soundproof type engine generator effectively cools the interior of the soundproof case and simplifies the constitution of the air feed passage via the layout and configuration of the fan.

13 Claims, 21 Drawing Sheets

U.S. PATENT DOCUMENTS

| | | | |
|---|---|---|---|
| 2,177,687 A * | 10/1939 | Bracken et al. | 290/1 A |
| 4,548,164 A * | 10/1985 | Ylonen et al. | 123/2 |
| 4,595,841 A * | 6/1986 | Yaguchi | 290/1 A |
| 4,608,946 A * | 9/1986 | Tanaka et al. | 123/2 |
| 4,622,923 A * | 11/1986 | Nishimura et al. | 123/2 |
| 4,647,835 A * | 3/1987 | Fujikawa et al. | 322/1 |
| 4,702,201 A * | 10/1987 | Odo et al. | 123/2 |
| 4,733,750 A * | 3/1988 | Poirier et al. | 181/202 |
| 4,748,824 A * | 6/1988 | Wakabayashi et al. | 62/239 |
| 4,779,905 A * | 10/1988 | Ito et al. | 290/1 B |
| 4,835,405 A * | 5/1989 | Clancey et al. | 290/1 A |
| 4,982,705 A * | 1/1991 | Hudson | 123/41.65 |
| 5,121,715 A * | 6/1992 | Nogami et al. | 123/41.7 |
| 5,231,956 A * | 8/1993 | Lux et al. | 123/41.65 |
| 5,269,265 A * | 12/1993 | Pretzsch et al. | 123/41.56 |
| 5,363,815 A * | 11/1994 | Pretzsch et al. | 123/41.7 |
| 5,433,175 A * | 7/1995 | Hughes et al. | 123/2 |
| 5,515,816 A * | 5/1996 | Ball et al. | 123/41.7 |
| 5,624,589 A * | 4/1997 | Latvis et al. | 219/133 |
| 5,626,105 A * | 5/1997 | Locke et al. | 123/3 |
| 5,642,702 A * | 7/1997 | Kouchi et al. | 123/198 E |
| 5,678,512 A * | 10/1997 | Colton | 123/2 |
| 5,694,889 A * | 12/1997 | Ball et al. | 123/41.7 |
| 5,731,687 A * | 3/1998 | Hirano et al. | 322/1 |
| 5,739,675 A * | 4/1998 | Green et al. | 322/1 |
| 5,899,174 A * | 5/1999 | Anderson et al. | 123/2 |
| 5,908,011 A * | 6/1999 | Stauffer et al. | 123/2 |
| 5,977,644 A * | 11/1999 | Smith | 290/1 B |
| 5,977,667 A * | 11/1999 | Hirose | 310/51 |
| 6,028,369 A * | 2/2000 | Hirose et al. | 290/1 A |
| 6,039,009 A * | 3/2000 | Hirose | 123/2 |
| 6,091,160 A * | 7/2000 | Kouchi et al. | 290/1 A |
| 6,095,099 A * | 8/2000 | Morohoshi et al. | 123/2 |
| 6,100,599 A * | 8/2000 | Kouchi et al. | 290/1 A |
| 6,376,944 B1 * | 4/2002 | Grizzle et al. | 310/52 |
| 6,431,126 B2 * | 8/2002 | Saito | 123/2 |
| 6,499,441 B2 * | 12/2002 | Suzuki | 123/2 |
| 6,552,454 B2 * | 4/2003 | Kern et al. | 310/89 |
| D477,569 S * | 7/2003 | Iwatate et al. | D13/116 |
| 6,660,967 B2 * | 12/2003 | Brofft et al. | 219/133 |
| 6,753,620 B2 * | 6/2004 | Fukuda | 290/1 A |
| 6,784,560 B2 * | 8/2004 | Sugimoto et al. | 290/1 R |
| 6,784,574 B2 * | 8/2004 | Turner et al. | 310/58 |
| 6,792,897 B2 * | 9/2004 | Higuchi et al. | 123/2 |
| 6,917,121 B2 * | 7/2005 | Akimoto et al. | 290/1 A |
| 6,962,057 B2 * | 11/2005 | Kurokawa et al. | 60/796 |
| 6,975,042 B2 * | 12/2005 | Yamada et al. | 290/1 R |
| 6,979,912 B2 * | 12/2005 | Mazuka et al. | 290/1 A |
| 7,005,608 B2 * | 2/2006 | Spear | 219/130.1 |
| 7,007,966 B2 * | 3/2006 | Campion | 280/423.1 |
| 7,023,101 B2 * | 4/2006 | Wang | 290/1 A |
| 7,049,707 B2 * | 5/2006 | Wurtele | 290/1 B |
| 7,107,943 B2 * | 9/2006 | Yasuda et al. | 123/41.62 |
| 7,129,604 B1 * | 10/2006 | Wang | 310/63 |
| 7,146,962 B2 * | 12/2006 | Sugimoto et al. | 123/198 E |
| 7,314,397 B2 * | 1/2008 | Sodemann et al. | 440/89 R |
| D567,175 S * | 4/2008 | Knuteson et al. | D13/112 |
| 7,392,770 B2 * | 7/2008 | Xiao | 123/41.7 |
| 7,398,747 B2 * | 7/2008 | Onodera et al. | 123/41.65 |
| 7,409,931 B2 * | 8/2008 | Kochi et al. | 123/41.7 |
| 7,430,992 B2 * | 10/2008 | Murakami et al. | 123/41.65 |
| 7,461,617 B2 * | 12/2008 | Onodera et al. | 123/2 |
| 7,482,706 B2 * | 1/2009 | Uchimi et al. | 290/1 A |
| 7,492,050 B2 * | 2/2009 | Brandenburg et al. | 290/1 B |
| 7,513,223 B2 * | 4/2009 | Onodera et al. | 123/41.7 |
| 2001/0011530 A1 * | 8/2001 | Saito | 123/2 |
| 2001/0029908 A1 * | 10/2001 | Suzuki | 123/41.31 |
| 2003/0042237 A1 * | 3/2003 | Brofft et al. | 219/133 |
| 2005/0061265 A1 * | 3/2005 | Yuasa et al. | 123/41.7 |
| 2006/0065216 A1 * | 3/2006 | Sugimoto et al. | 123/41.7 |
| 2006/0214425 A1 * | 9/2006 | Yamamoto et al. | 290/1 A |
| 2007/0108767 A1 * | 5/2007 | Hirose et al. | 290/1 A |
| 2008/0127912 A1 * | 6/2008 | Onodera et al. | 123/2 |
| 2008/0202447 A1 * | 8/2008 | Kochi et al. | 123/2 |
| 2008/0238107 A1 * | 10/2008 | Yamamoto et al. | 290/1 R |
| 2008/0252080 A1 * | 10/2008 | Xiao | 290/1 A |

FOREIGN PATENT DOCUMENTS

JP      2006-188982      7/2006

* cited by examiner

SOUNDPROOF TYPE ENGINE GENERATOR

The present application is based on and claims priority under 35 U.S.C. §119 to Japanese Patent Application No. 2007-096746, filed on Apr. 2, 2007, the entire contents of which are expressly incorporated by reference herein.

BACKGROUND OF THE INVENTION

1. Field of the Invention

This invention relates to a soundproof type of engine generator with a generator and an engine disposed side by side in a soundproof case.

2. Description of the Related Art

Conventional soundproof type generators include, for example a generator and an engine disposed side by side in a soundproof case. Such a soundproof type generator is provided with internal air feed passage for passing cooling air for cooling of the engine and generator (For example, see Japanese Publication No. JP 2006-188980).

According to JP 2006-188980, external air is suctioned into an engine generator through suction holes provided in the bottom and front parts of the engine generator. The suctioned air flows as cooling air into the generator duct. While flowing through the generator duct, the cooling air cools the generator and flows out through openings.

According to JP 2006-188980, external air is suctioned through the suction holes provided in the bottom and front parts of the engine generator. As the generator is cooled with the suctioned air, the air in the generator is heated up with the heat generated with the engine and also flows into the generator duct. As a result, the generator may not be cooled effectively.

SUMMARY OF THE INVENTION

In view of the circumstances noted above, an aspect of at least one of the embodiments disclosed herein is to provide a soundproof type of generator that makes it possible to effectively cool the interior of the soundproof case, and to simplify the layout and attachment constitution of the fan, and the constitution of the air feed passage by means of the fan.

In accordance with one aspect of the present invention, a soundproof type engine generator with a generator and an engine disposed side by side in a soundproof case is provided. The soundproof type engine generator comprises a first external air inlet and a second external air inlet on the soundproof case and a first cooling passage configured to guide external air introduced from the first external air inlet through a duct to a first fan, the first fan configured to guide the said external air to the generator, the air then discharged out of the soundproof case. The soundproof type engine generator also comprises a second cooling passage configured to guide external air introduced from the second external air inlet with a second fan to the engine, the air then discharged out of the soundproof case. The first fan comprises a disk-like planar part and a plurality of first blades and second blades provided respectively on opposite sides of the planar part, wherein external air introduced into the soundproof case from the first external air inlet with the plurality of first blades is guided through the duct to the generator and then discharged out of the soundproof case, and air in the soundproof case is discharged with the plurality of second blades out of the soundproof case.

In another aspect of the present invention, a soundproof type engine generator, comprising: with a generator and an engine disposed side by side in a soundproof case is provided. The soundproof type engine generator comprises an internal combustion engine, a generator disposed adjacent the internal combustion engine, and a substantially soundproof case configured to house at least the internal combustion engine and the generator, the soundproof case defining a first external air inlet and a second external air inlet. The soundproof type engine generator also comprises a first fan disposed between the generator and the engine, the first fan configured to draw a first external air flow through the first external air inlet and to guide the first external air flow through a first cooling passage to the generator, the first external air flow discharged out of the soundproof case, and a second fan disposed between the second external air inlet in the substantially soundproof case and the engine, the second fan configured to draw a second external air flow through the second external air inlet and to guide the second external air flow through a second cooling passage to the engine, the second external air flow discharged out of the soundproof case, the second cooling passage being separate from the first cooling passage.

In accordance with still another aspect of the present invention, a method for operating a soundproof type engine generator having a generator and an engine disposed side by side in a soundproof case is provided. The method comprises drawing a first external air flow through the soundproof case and directing said first external air flow to the generator, the first external air flow ejected out of the soundproof case, and drawing a second external air flow through the soundproof case and directing said second external air flow to the engine, the second external air flow ejected out of the soundproof case, wherein the first external air flow and second external air flow are directed separately to the generator and engine, respectively, so as to effectively cool the generator and engine.

BRIEF DESCRIPTION OF THE DRAWINGS

These and other features, aspects and advantages of the present inventions will now be described in connection with preferred embodiments, in reference to the accompanying drawings. The illustrated embodiments, however, are merely examples and are not intended to limit the inventions. The drawings include the following 21 figures.

DETAILED DESCRIPTION OF THE PREFERRED EMBODIMENTS

FIGS. 1 through 9 show external shape and constitution of one embodiment of a soundproof type engine generator 10.

Figure 9:
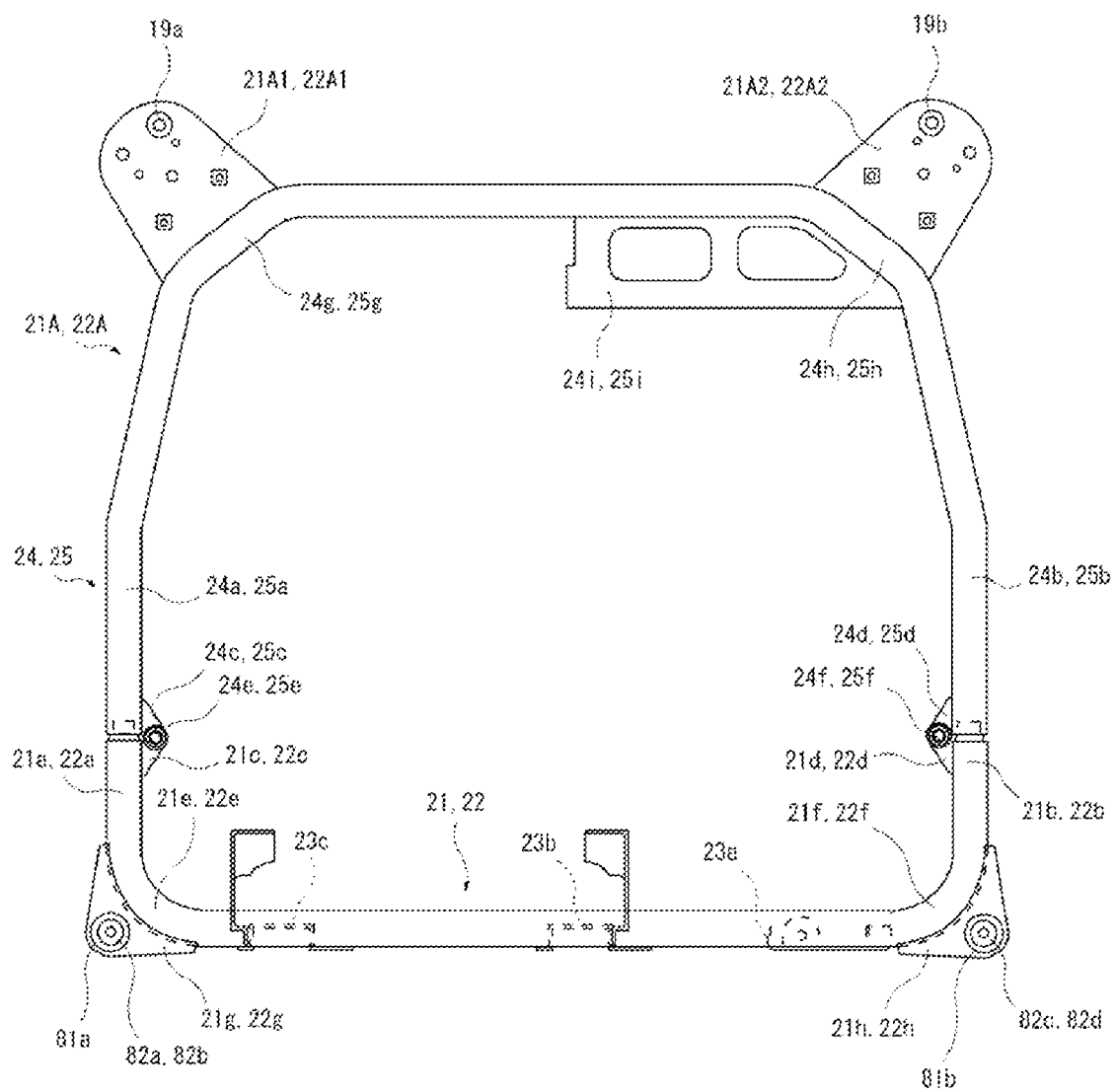
FIG. 9 is a schematic front elevation view, showing a front frame and a rear frame of one embodiment of a soundproof type engine generator.

The soundproof case K of the soundproof type engine generator 10 can be of a slightly rounded, quasi-box shape. A front frame 21A and a rear frame 22A, which can be made of metallic pipe, can be disposed at the front and rear of the case K, set apart by a specified distance from each other. The front frame 21A and the rear frame 22A are respectively covered with front cover 11 and a rear cover 12, which can be made of resin material. As shown in FIG. 9, when a virtual plane parallel to the drawing surface is assumed between the front frame 21A and the rear frame 22A, both the frames are in symmetrical on both sides of the virtual plane. The front frame 21A is made up of a front lower frame 21 and a front support frame 24. Both ends 21a, 21b of the front lower frame 21 are bent to extend upward. Both ends 24a, 24b of the front support frame 24 are bent to extend downward. Both ends 24a, 24b are inserted into and connected to both ends 21a, 21b. Mounting brackets 21c, 21d fixedly welded inside both ends 21a, 21b and mounting brackets 24c, 24d fixedly welded inside both ends 24a, 24b are overlapped and secured with fastening bolts 24e, 24f. The rear frame 22A is made up of a rear lower frame 22 and a rear support frame 25. However, the brackets 21A1, 22A1, 21A2, 22A2 can be fastened in any suitable manner (e.g., with brackets). Both ends 22a, 22b of the rear lower frame 22 are bent to extend upward. Both ends 25a, 25b of the rear support frame 25 are bent to extend downward. Both ends 25a, 25b are inserted into and connected to both ends 22a, 22b. Mounting brackets 22c, 22d fixedly welded inside both ends 22a, 22b and mounting brackets 25c, 25d fixedly welded inside both ends 25a, 25b are overlapped and secured by tightening joining bolts 25e, 25f.

Handle mounting brackets 21A1, 22A1 and handle mounting brackets 21A2, 22A2 are fixedly welded to curved parts 24g, 25g on the left side and curved parts 24h, 25h on the right side of the front support frame 24 and the rear support frame 25. Both ends of the handle 19a are attached to the handle mounting brackets 21A1, 22A1. Both ends of the handle 19b are attached to the handle mounting brackets 21A2, 22A2. Fuel tank mounting plates 24i, 25i are fixedly welded to corresponding right positions of the front support frame 24 and the rear support frame 25.

The front lower frame 21 and the rear lower frame 22 are interconnected through connecting frames 23a, 23b, 23c. Wheel shaft mounting brackets 21g, 22g and 21h, 22h can be respectively fixedly welded to outer sides of bent parts 21e, 22e and bent parts 21f, 22f of the front lower frame 21 and the rear lower frame 22. The wheel shaft mounting brackets 21g, 22g and 21h, 22h are respectively made of triangular metallic plate. Wheel shafts 82a, 82b fixedly welded to both ends of a pipe 81a can be fixedly welded to the wheel shaft mounting brackets 21g, 22g. Wheel shafts 82c, 82d fixedly welded to both ends of a pipe 81b can be fixedly welded to the wheel shaft mounting brackets 21h, 22h. In this way, the front frame 21A and the rear frame 22A are interconnected in their upper positions through handles 19a, 19b which can be of iron pipe, and in lower positions through pipes 81a, 81b which can be of iron. A front panel 13 is placed on the front cover 11 while a rear panel 17 is placed on the rear cover 12. Between the respectively placed front cover 11 and rear cover 12 are placed a top cover 14, a right side cover 15, a left side cover 16, and a bottom cover 18. The front panel 13, the rear panel 17, the top cover 14, and the right side cover 15, the left side cover 16, and the bottom cover 18 can be respectively made of resin material.

The front cover 11 and rear cover 12 can have the same shape, and their main parts 11a, 12a can be approximately square shaped with the upper two corners rounded. A pair of lugs 11b, 11c are formed at the upper two corners of the cover main part 11a. A pair of lugs 12b, 12c are formed at the upper two corners of the cover main part 12a. The two pairs of lugs 11b, 12b and lugs 11c, 12c cover the handle mounting brackets 21A1, 22A1 of the front frame 21A, and the handle mounting brackets 21A2, 22A2 of the rear frame 22A. The soundproof type engine generator 10 is portable by gripping the handle 19a mounted to the handle mounting brackets 21A1, 22A1, and the handle 19b mounted to the handle mounting brackets 21A2, 22A2.

Both sides of the cover main part 11a can be formed to gradually widen downward, so that its lower corners 11d, 11e are located sidewise wider than the pair of lugs 11b, 11c respectively located above the lower corners. Likewise, both sides of the cover main part 12a can be formed to gradually widen downward, so that its lower corners 12d, 12e are located sidewise wider than the pair of lugs 12b, 12c respectively located above the lower corners. To the lower corners 11d, 11e are respectively attached wheel covers 80a, 80c. Likewise, to the lower corners 12d, 12e are respectively attached wheel covers 80b, 80d.

To the positions of opposing wheel cover 80a and wheel cover 80b are attached wheel shafts 82a, 82b provided at both ends of the pipe 81a. Wheels 83a, 83b can be attached with bolts 84a, 84b to the wheel shafts 82a, 82b, so that the wheels 83a, 83b are rotatable on the wheel shafts 82a, 82b. Likewise, to the positions of opposing wheel cover 80c and wheel cover 80d are attached wheel shafts 82c, 82d provided at both ends of the pipe 81b. Wheels 83c, 83d can be attached with bolts 84c, 84d to the wheel shafts 82c, 82d, so that the wheels 83c, 83d are rotatable on the wheel shafts 82c, 82d.

A stop cover 85a is attached between the wheel cover 80b and the outer side of the wheel shaft 82b with a bolt 85b and a bolt 84b. A stop lever 85c is rotatably attached to the stop cover 85a. Rotation of the wheel 83b may be stopped by turning the stop lever 85c and pressing it against the wheel 83b to make the soundproof type engine generator 10 immovable.

Figure 1:
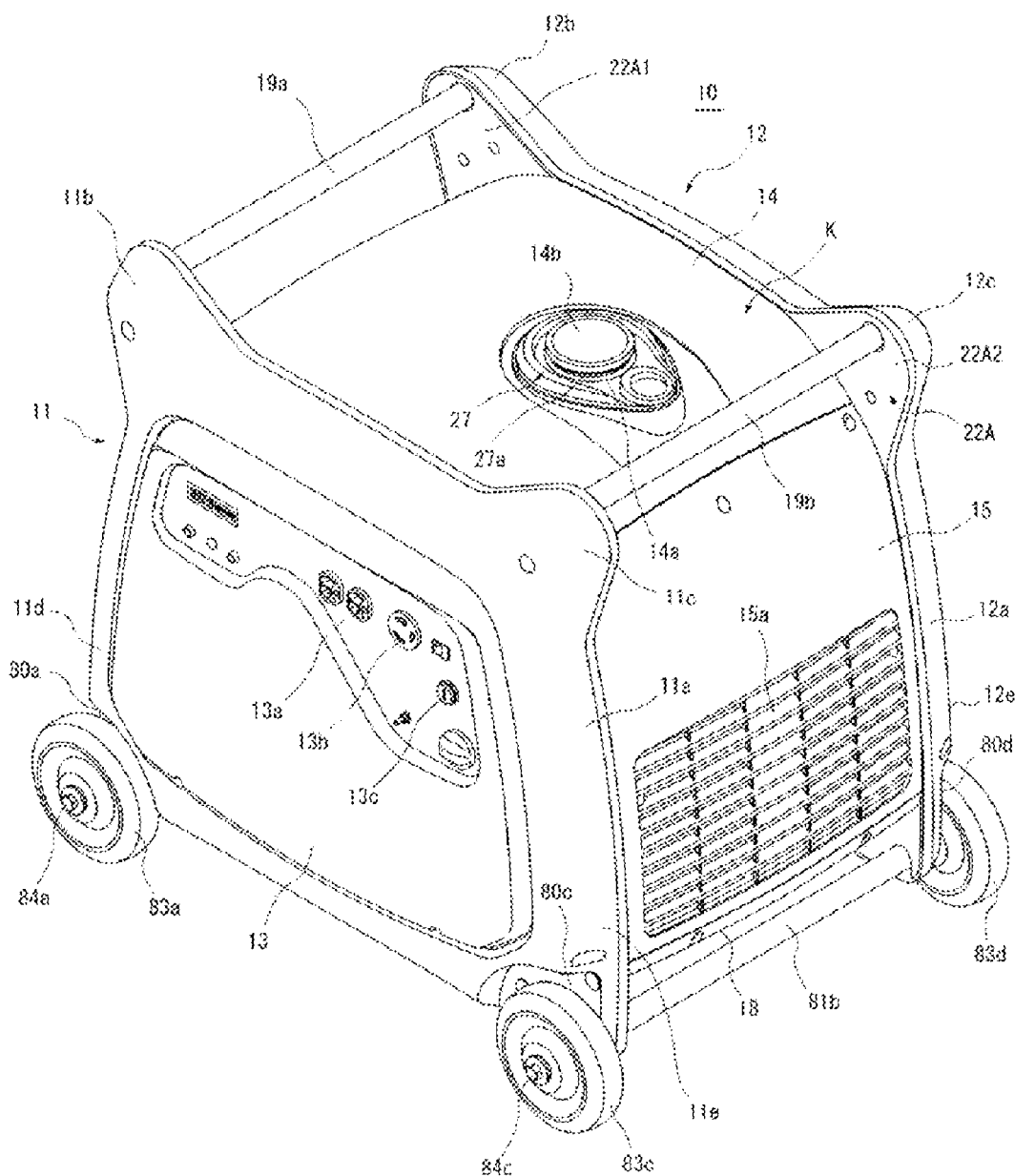
FIG. 1 is a schematic oblique view as seen from the front side of a soundproof type engine generator, in accordance with one embodiment.
Figure 2:
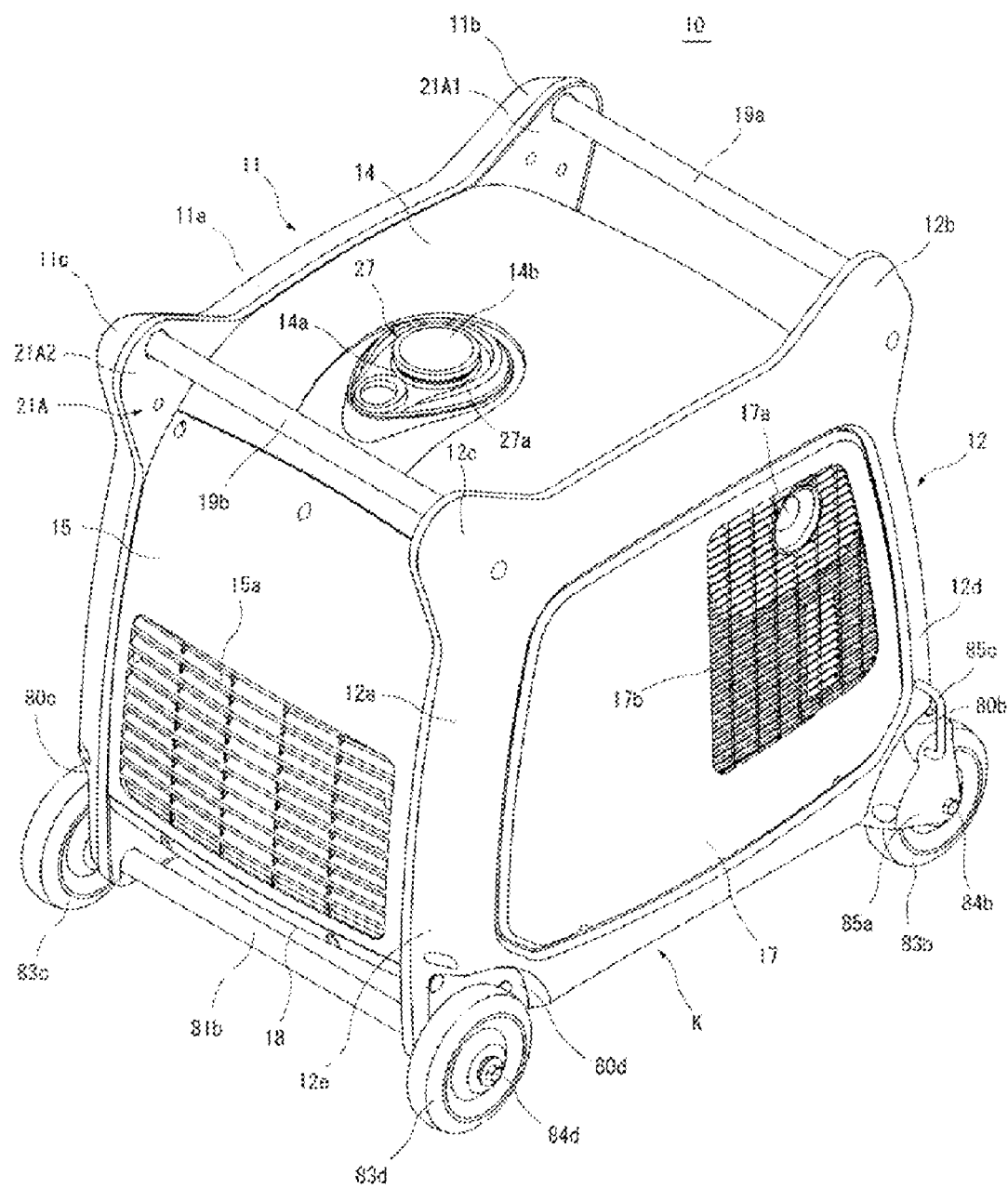
FIG. 2 is a schematic view as seen from the rear side of the soundproof type of engine generator.
Figure 3:
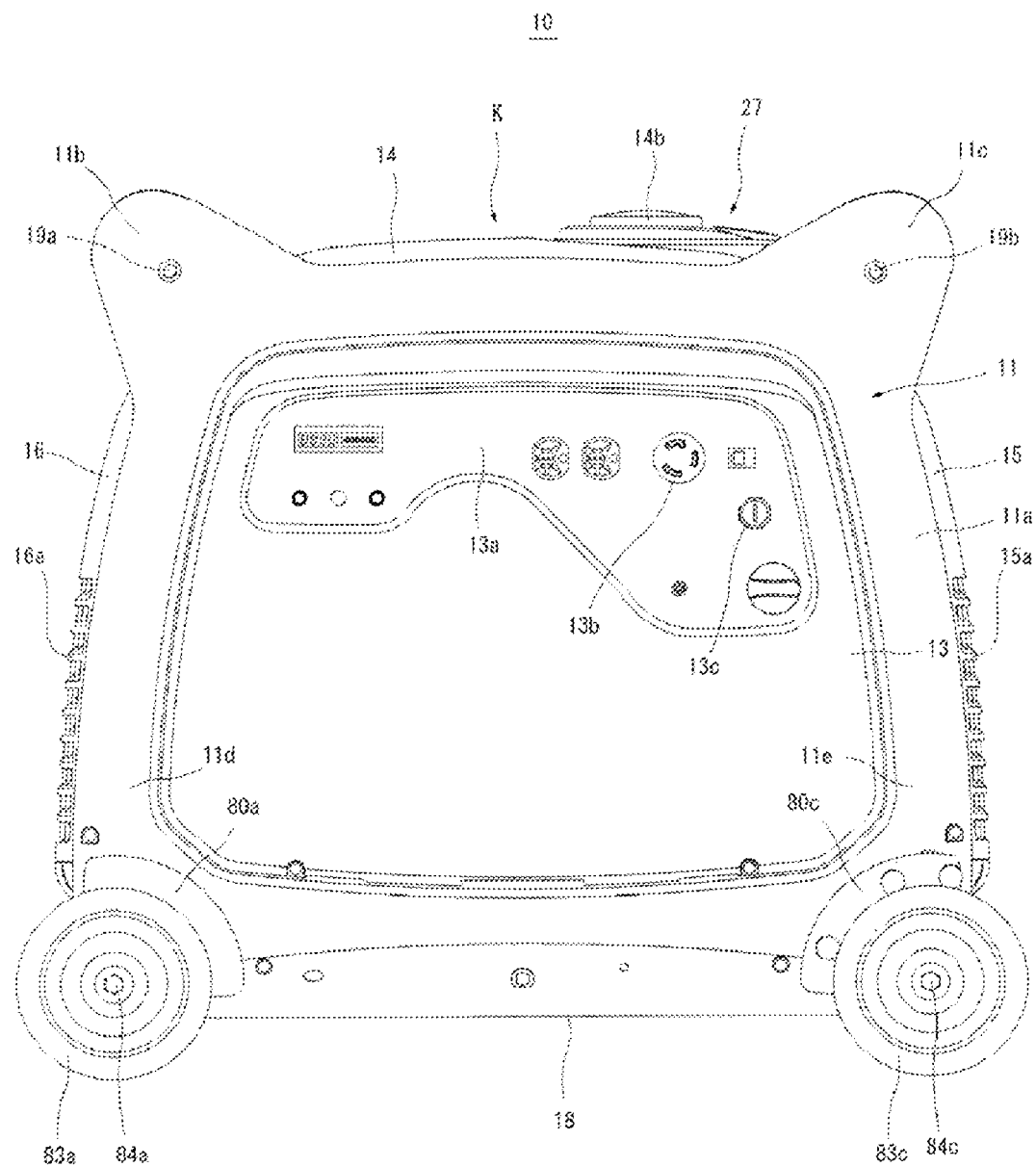
FIG. 3 is a schematic front elevation view of the soundproof type of engine generator.
Figure 4:
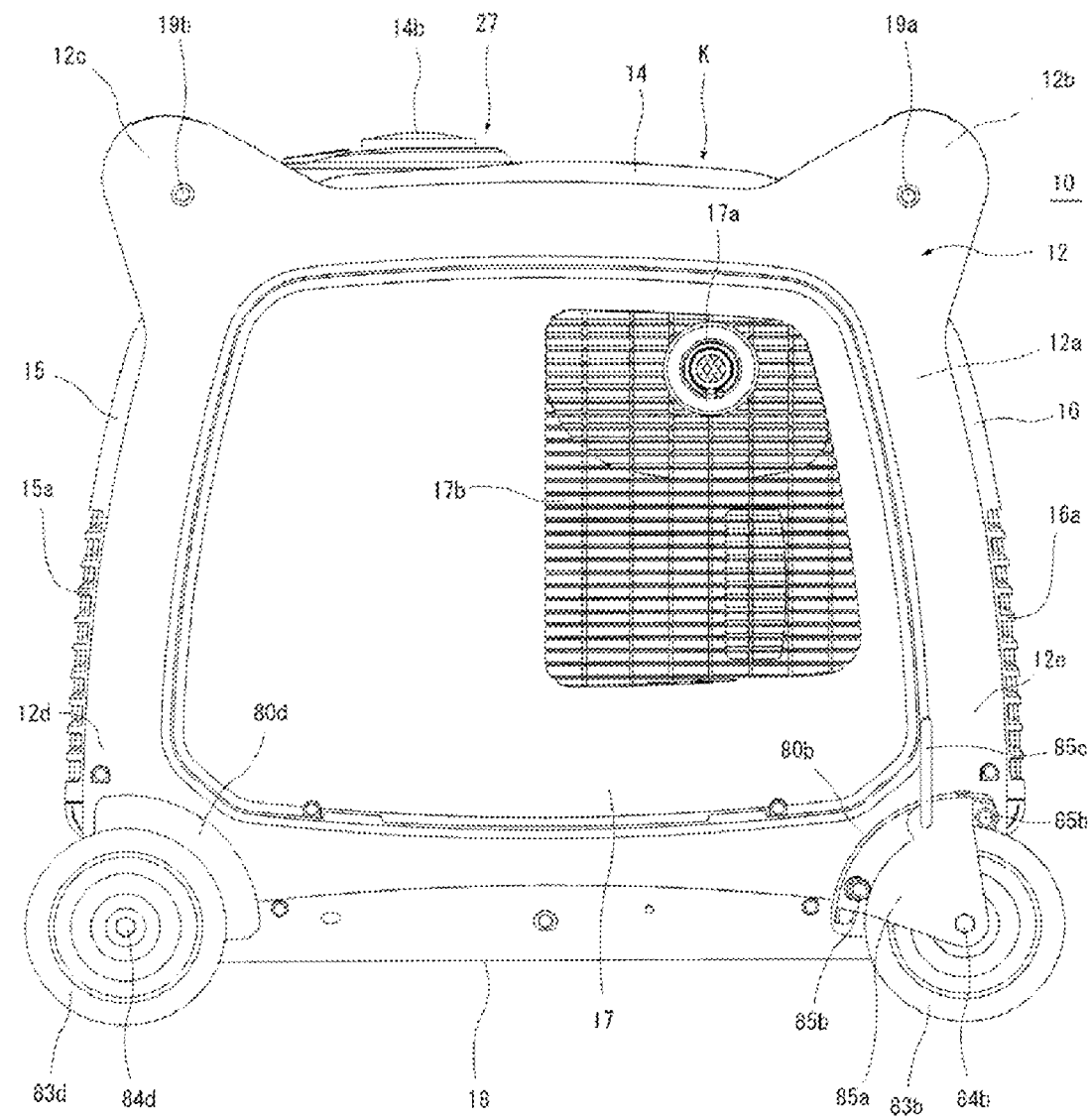
FIG. 4 is a schematic rear elevation view of the soundproof type of engine generator.
Figure 5:
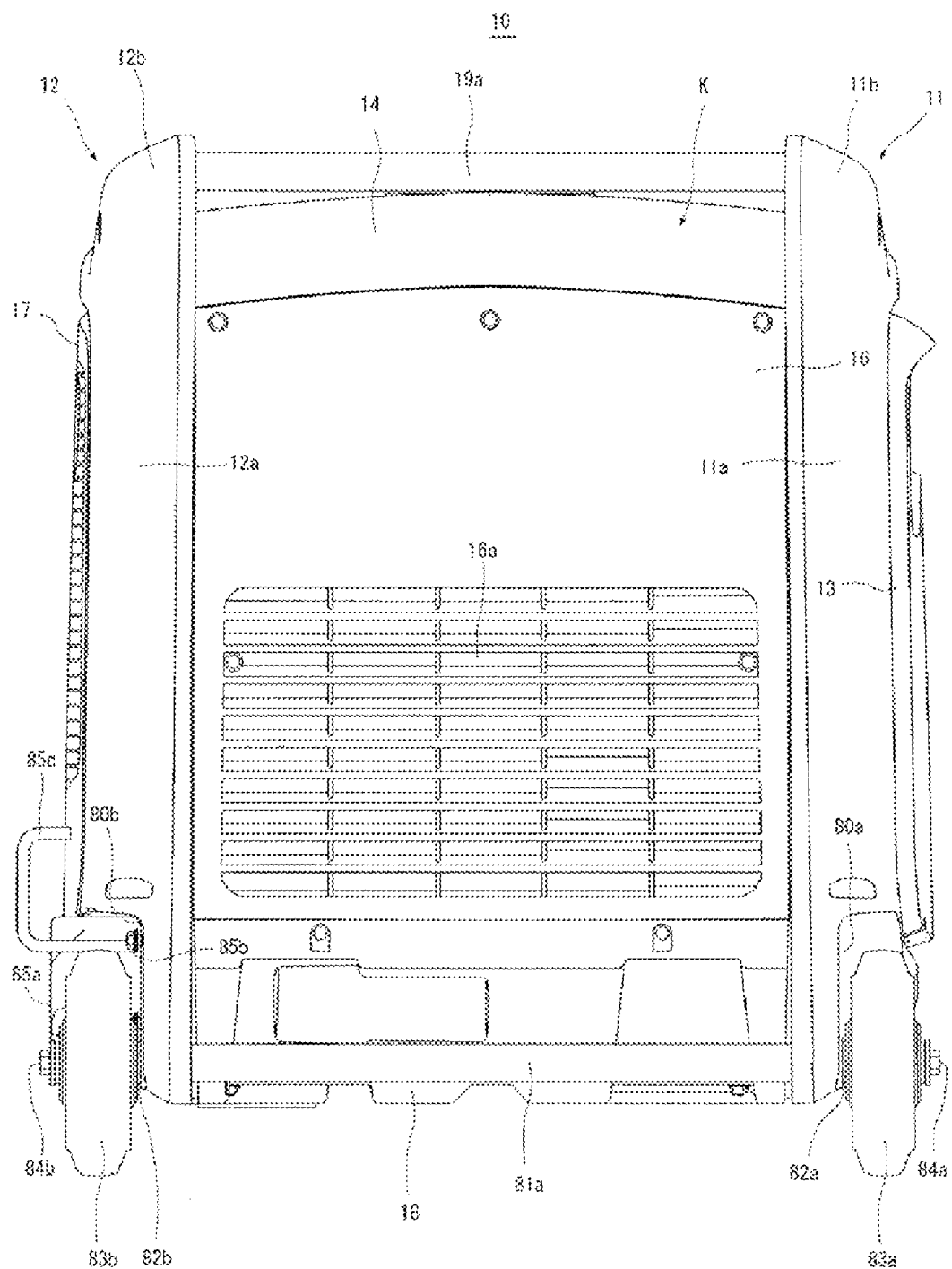
FIG. 5 is a schematic left side view of the soundproof type of engine generator.
Figure 6:
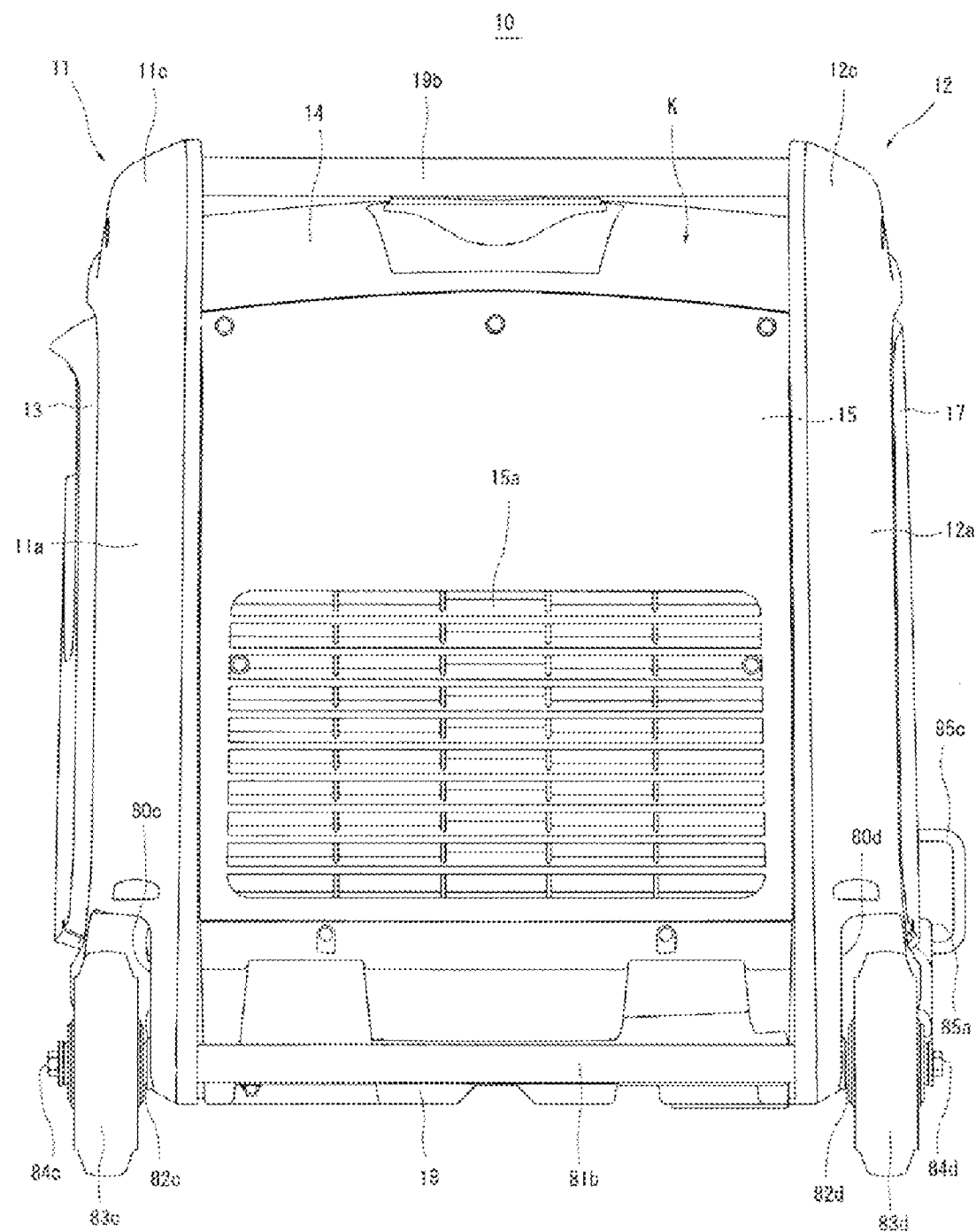
FIG. 6 is a schematic right side view of the soundproof type of engine generator.
Figure 7:
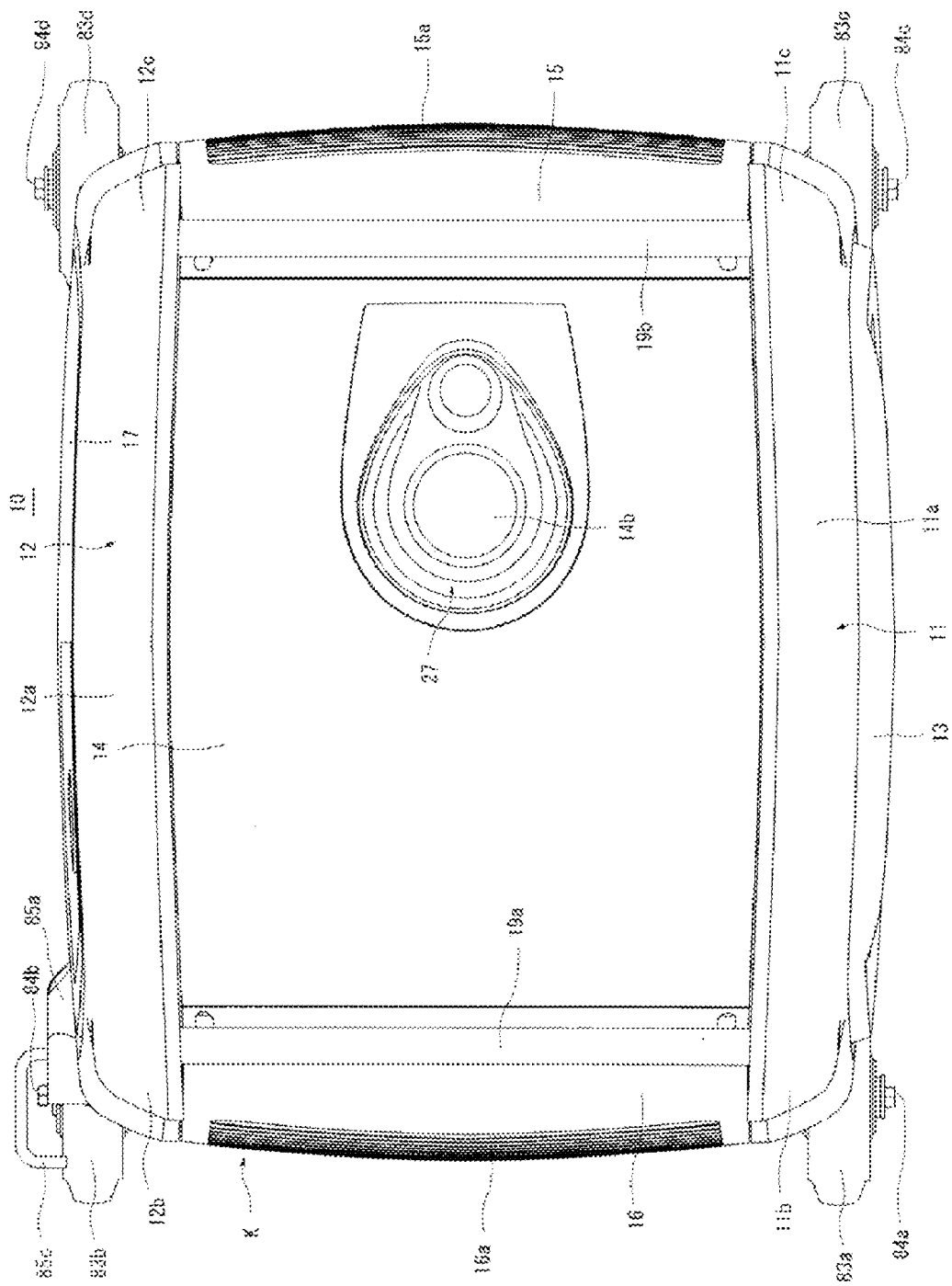
FIG. 7 is a schematic top plan view of the soundproof type of engine generator.

As shown in FIGS. 3 and 4, the side ends of the wheels 83a, 83b are located farther in the advancing direction than the side ends of the lugs 11b, 12b and the left side cover 16. Likewise, the side ends of the wheels 83c, 83d are located farther in the advancing direction than the side ends of the lugs 11c, 12c and the right side cover 15. As a result, when the soundproof type engine generator 10 is placed near a wall or moved, the wheels 83a, 83b or the wheels 83c, 83d come into contact with the obstacle instead of the right side cover 15 or the left side cover 16.

Also, when the soundproof type engine generator 10 is to be raised to a high position (e.g. to place it on a cart or vehicle), it is possible to raise it to the high position by gripping the opposing pipe 81a and the pipe 81b below the soundproof type engine generator 10.

The front panel 13 is attached within the frame of the front cover 11 to constitute the front face of the soundproof type of engine generator 10, and is made as an integrally formed component of resin material. The front panel 13 is formed with a recess 13a in which are provided an electric outlet 13b, various switches 13c, etc.

The top cover 14 is attached between top end brims of the front frame 21A and the rear frame 22A to constitute the top face of the soundproof type of engine generator 10, with its central part curving upward and extending right and left in a curved surface shape. In the approximate center of the top cover 14 is formed in a raised shape a fuel filler port passage part 14a for passing the fuel filler port 27a of a fuel tank 27. A fuel cap 14b is attached to the fuel filler port 27a.

The right side cover 15 and the left side cover 16 are attached to both side edges of the front frame 21A and the rear frame 22A to constitute respectively side faces of the soundproof type of engine generator 10. A second external air inlet 15a that can be made up of a plurality of laterally extending slits, one above another, can be provided in part of the right side cover 15 from about its center to its lower part. Likewise, a first external air inlet 16a that can be made up of a plurality of laterally extending slits, one above another, can be provided in part of the left side cover 16 from about its center to its lower part. An outlet 17a (e.g. a round exhaust hole) can be formed in the upper part of the rear part of the rear panel 17. An outlet 17b that can be made up of a plurality of laterally extending slit-shaped exhaust openings, one above another, can be formed in part of the rear panel 17 from about its center to its side.

The rear panel 17 is attached within the frame of the rear cover 12 to form the rear face of the soundproof type engine generator 10, and can be generally of the same shape as the front panel 13. The bottom cover 18 is attached between the lower end edges of the side frame 21A and the rear frame 22A to form the bottom face of the soundproof type engine generator 10.

Figure 8:
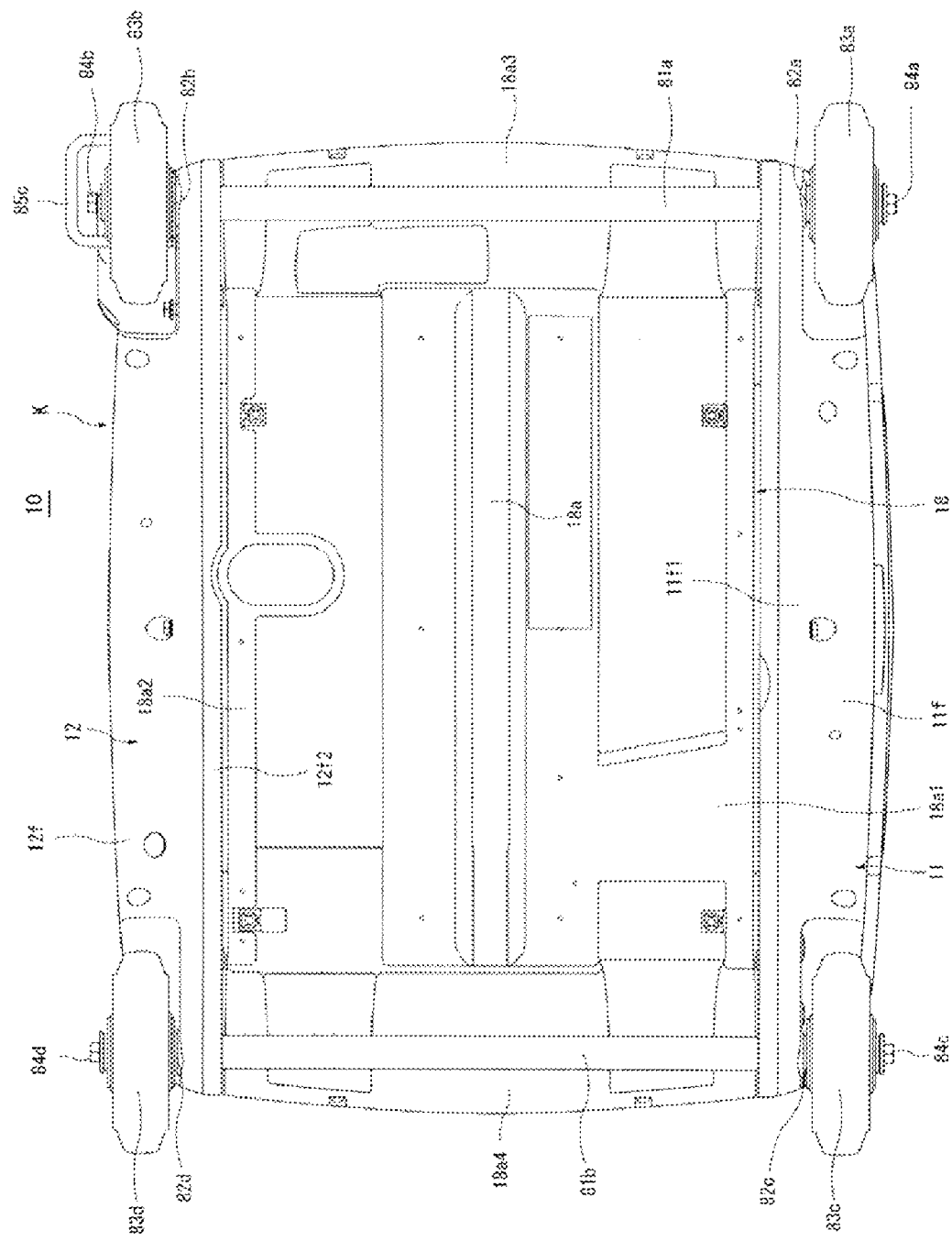
FIG. 8 is a schematic bottom view of the soundproof type of engine generator.
Figure 10:
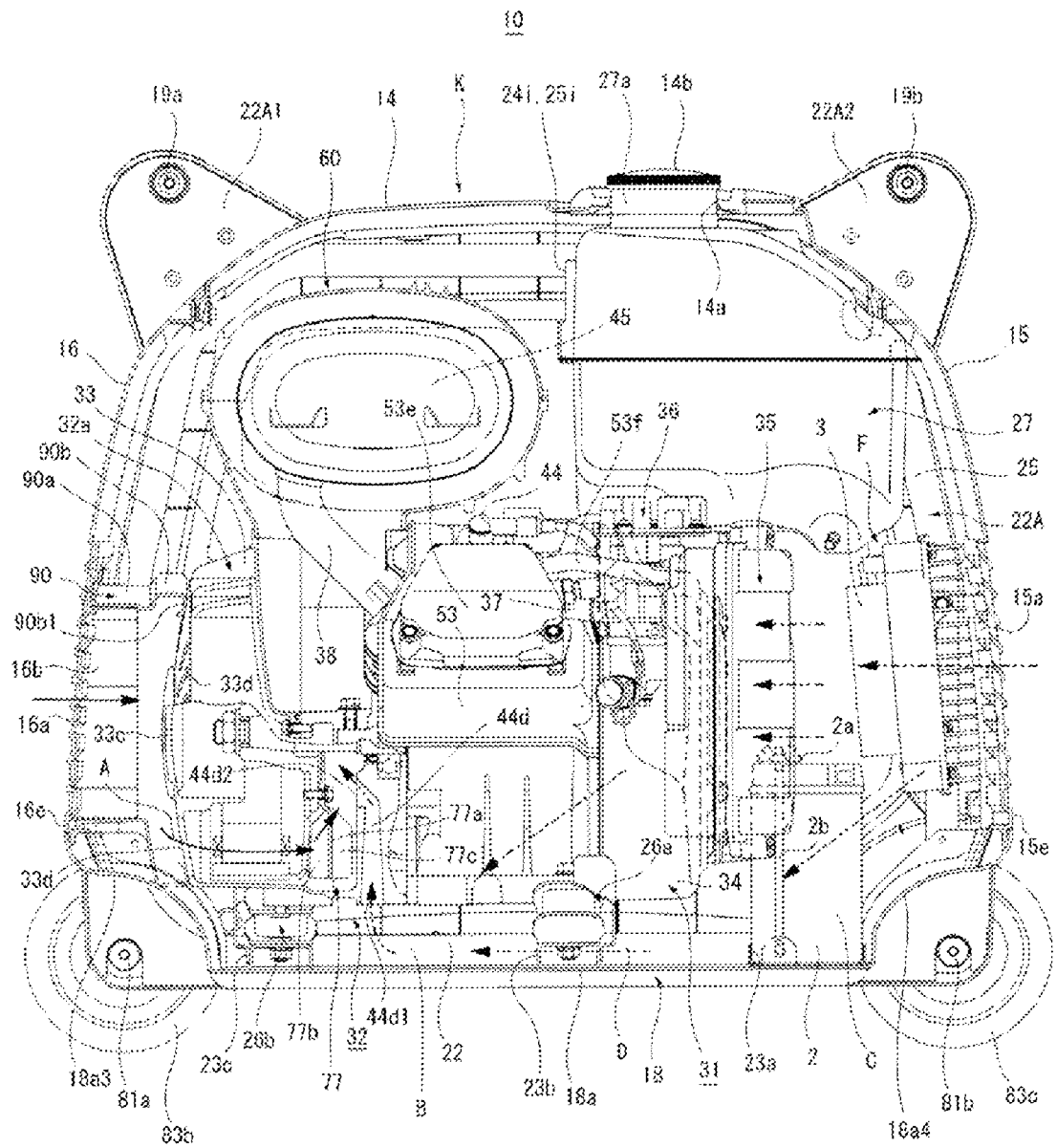
FIG. 10 is a schematic front elevation view of the soundproof type engine generator in partial cross-section, to show its interior.
Figure 12:
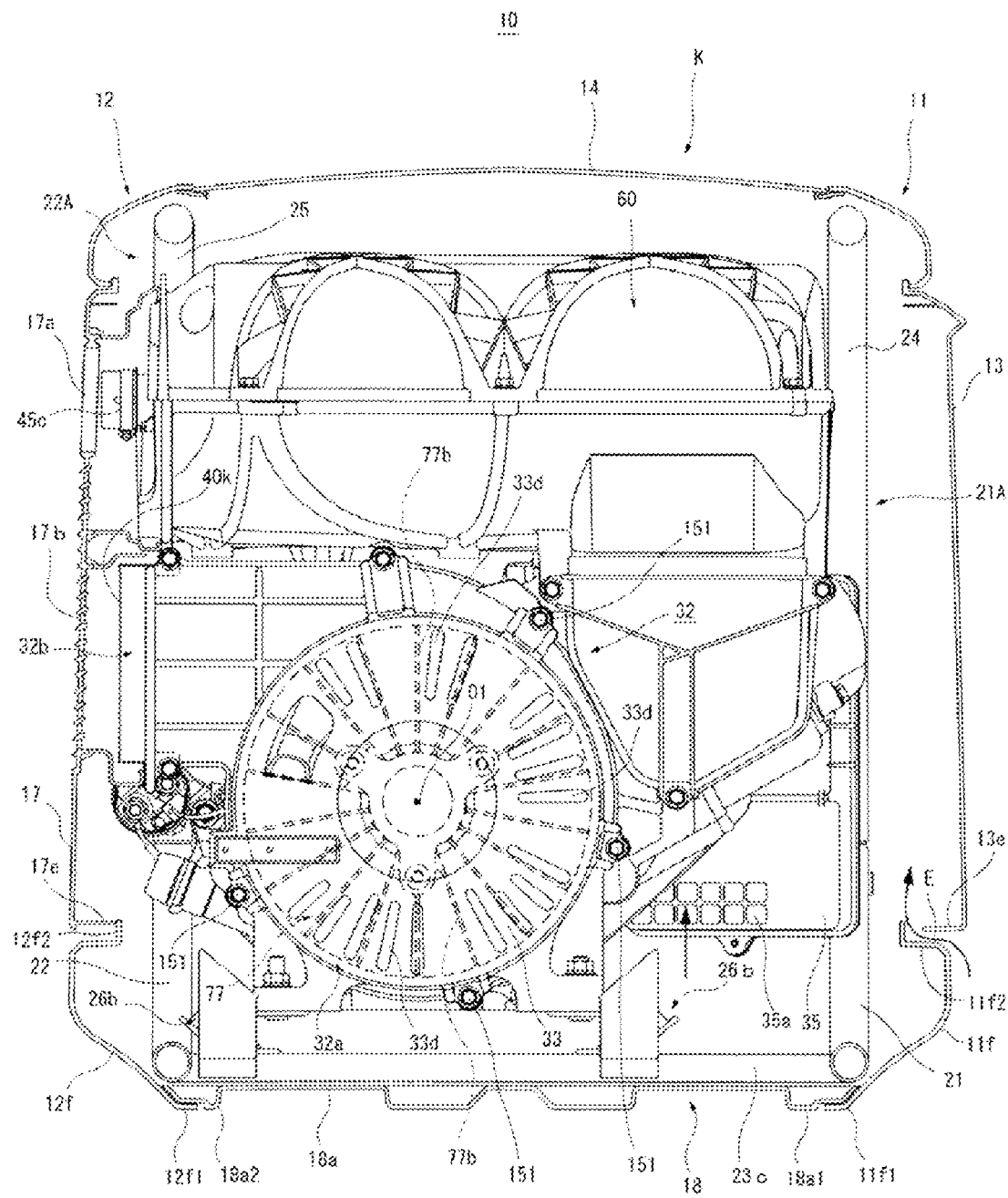
FIG. 12 is a schematic side view of the soundproof type engine generator, in partial cross-section to show its interior.
Figure 13:
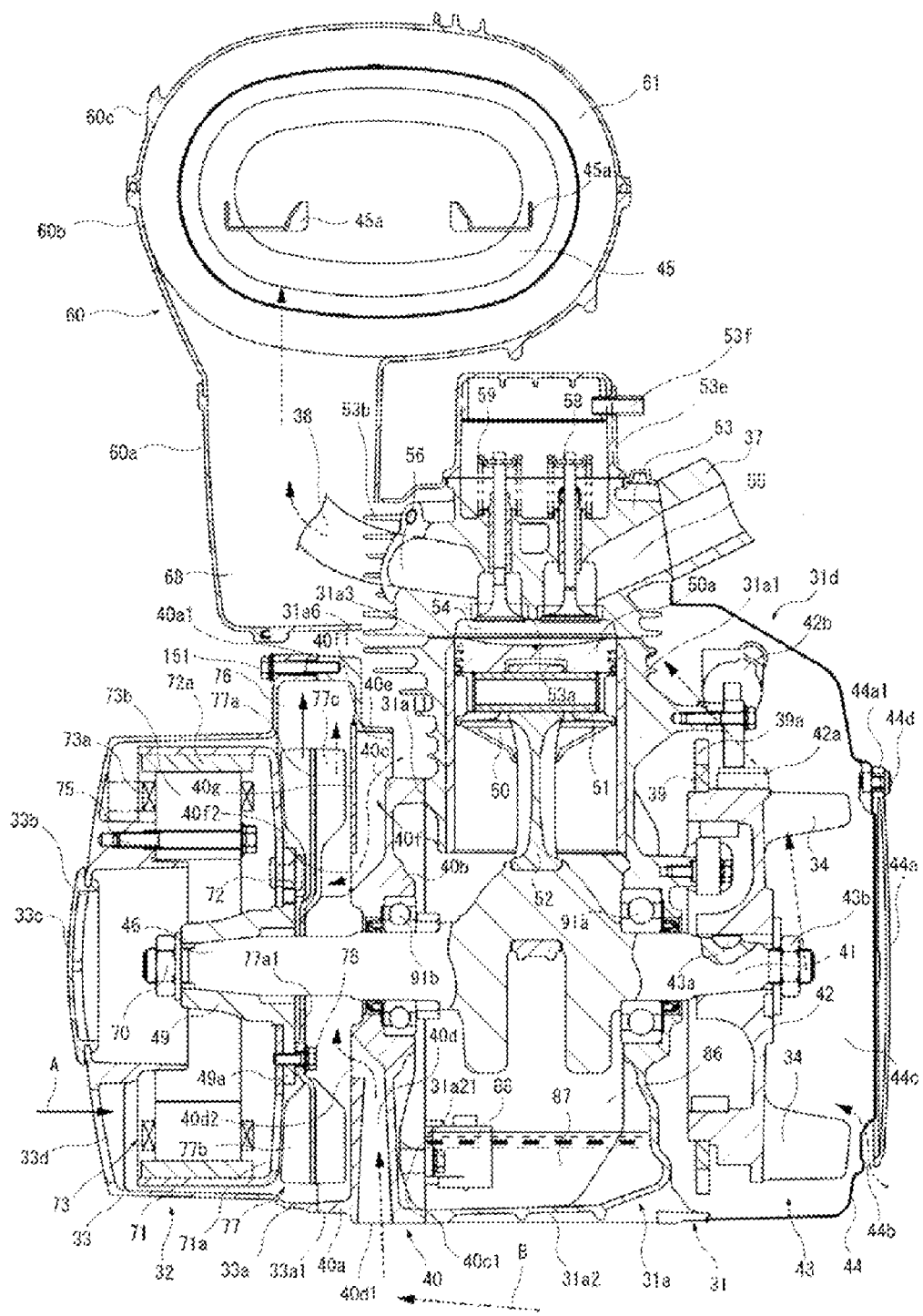
FIG. 13 is a schematic sectional view of a generator and engine.
Figure 14:
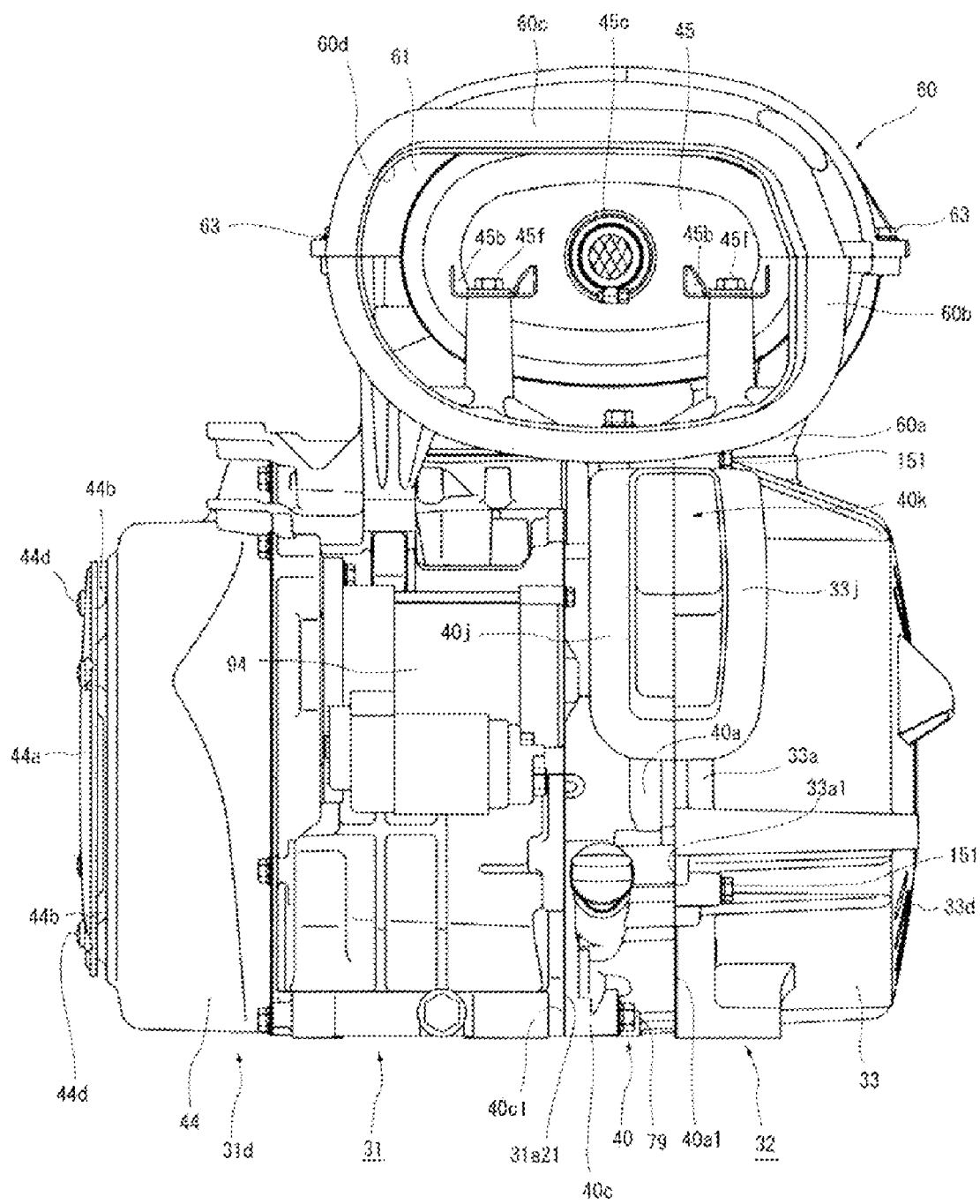
FIG. 14 is a schematic side view of the generator and engine as seen from the exhaust side.

As for the bottom cover 18, as shown in FIG. 8 and later in FIGS. 10 and 12, the front end 18a1 of the bottom part 18a is placed over and joined to the lower end 11f1 of the front lower part 11f of the front cover 11. Likewise, the rear end 18a2 of the bottom part 18a is placed over and joined to the lower end 12f1 of the front lower part 12f of the front cover 12. As shown in FIG. 12, an air suction hole E can be formed in part of the part between the upper end 11f2 of the front lower part 11f of the front cover 11 and the lower end 13e of the front panel 13. The upper end 12f2 of the rear lower part 12f of the rear cover 12 and the lower end 17e of the rear panel 17 are joined together without a gap. The left end 18a3 of the bottom part 18a rises in an inward curve to form an arcuate recess, and can be placed on and joined to the lower end 16e of the left side cover 16 from outside as shown in FIG. 10. The right end 18a4 of the bottom part 18a rises in an onward curve to form an arcuate recess, and can be placed on and joined to the lower end 15e of the right side cover 15 from outside.

FIGS. 10 through 21 show the internal constitution of the soundproof type engine generator 10.

Figure 11:
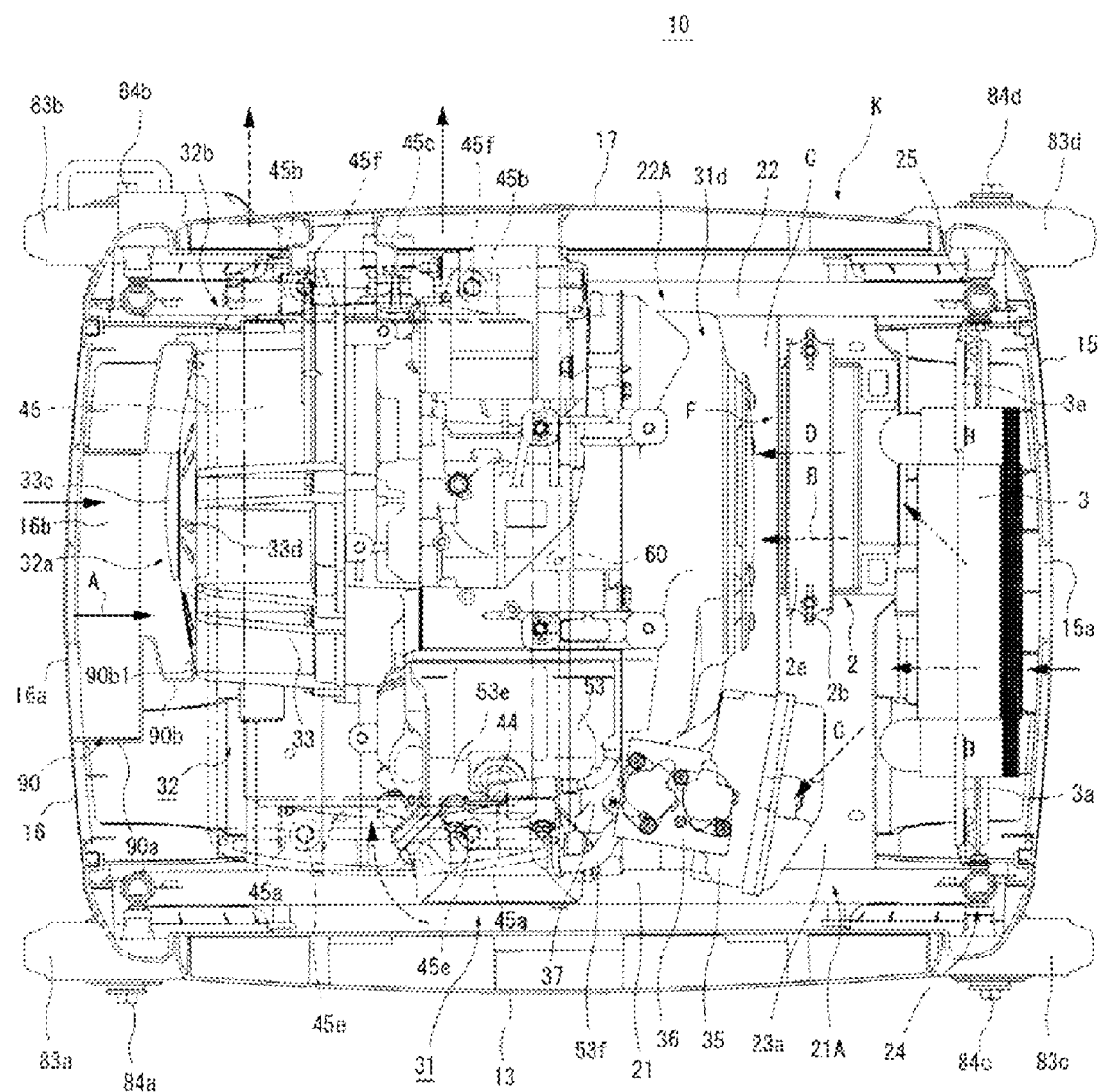
FIG. 11 is a schematic top plan view of the soundproof type engine generator, in partial cross-section, to show its interior.

Referring to FIGS. 10 to 12, the internal layout constitution of the soundproof type engine generator 10 is described. Inside the soundproof type engine generator 10 are placed an engine 31 and a generator 32 side by side. The engine 31 can be supported through a pair of front and rear mounts 26a on the connecting frame 23b. The generator 32 can be supported through a pair of front and rear mounts 26b on the connecting frame 23c. In this way the generator 32 and the engine 31 are placed in the soundproof case K.

A battery 2 can be placed behind the connecting frame 23a in the soundproof type of engine generator 10. An attachment plate 2a can be put on the top part of the battery 2, and both ends of the attachment plate 2a can be secured to the connecting frame 23a using attachment members 2b. A fuel tank 27 can be placed above the engine 31 and mounted to fuel tank mounting plates 24i, 25i of the front support frame 24 and the rear support frame 25. The fuel filler port 27a described before is provided in the central top part of the fuel tank 27. The fuel filler port 27a passes through the fuel filler port passage part 14a to project up beyond the top cover 14. A removable filler cap 14b is fitted to the fuel filler port 27a.

A controller 3 can be placed in a position facing the second external air inlet 15a in the vicinity of the right side cover 15 in the soundproof type engine generator 10. Both ends of the controller 3 can be attached to the front support frame 24 and the rear support frame 25 through brackets 3a. To the engine 31 can be attached a suction fan part 31d, as shown in FIG. 11. The suction fan part 31d can be located on the controller 3 side.

An air cleaner 35 can be placed in about the vertical center of the front right side part in the soundproof type engine generator 10 to suction air through the suction port 35a (see FIG. 12). A carburetor 36 can be placed beside the air cleaner 35 in a position nearer to the engine 31 than to the air cleaner 35. The air cleaner 35 can be placed on the suction side of the engine 31 to clean the air drawn in through the suction fan part 31d into the soundproof case K, and to feed the cleaned air to the carburetor 36.

Fuel supplied from the fuel tank 27 to the carburetor 36 is mixed with air supplied to the carburetor 36 to make a mixture that is supplied through a suction pipe 37 to the engine 31. The engine 31 is provided with an ignition plug 44 to ignite and combust the mixture supplied from the carburetor 36. The combustion causes the engine 31 to operate. Blow-by gas filling the interior of the head gap 53e of the cylinder head 53 is returned through a blow-by gas pipe 53f to the air cleaner 35, mixed with air, and combusted again, so that blow-by gas is not released into the atmosphere.

A silencer 45 can be provided through an exhaust pipe 38 on the exhaust side of the engine 31. The exhaust pipe outlet 45c of the silencer 45 can face the outlet 17a of the rear panel 17. The silencer 45 can be attached through front and rear stays 45a, 45b using front and rear bolts 45e, 45f to the interior of the exhaust case 60.

Exhaust gas emitted from the engine 31 is fed through the exhaust pipe 38 to the silencer 45 to be silenced, and released outside. The exhaust case 60 can be positioned above the engine 31. External air suctioned with the suction fan part 31d cools the engine 31, flows through the exhaust case 60, and goes out through both the outlet 17a and the outlet 17b of the rear panel 17.

The generator 32 can be placed in the vicinity of the left side cover 16 in the soundproof type engine generator 10. The generator 32 is provided with an inlet part 32a and an outlet part 32b. A duct 90 is provided between the left side cover 16 and the suction part 32a of the generator 32 (see FIG. 12). The duct 90 can be made of rubber as a single part including a cover attachment part 90a and a generator attachment part 90b. The cover attachment part 90a can be attached by fitting it to a guide cylinder part 16b projecting inward and communicating with the first external air inlet 16a of the left side cover 16. The generator attachment part 90b can extend from the cover attachment part 90a toward the inlet part 32a of the generator 32 and can be formed in a shape that follows the external shape of a generator cover 33 configuring the inlet part 32a of the generator 32, with its fore-end 90b1 curved inward. The fore-end 90b1 can be pressed against and attached to the outer surface of the generator cover 33. The generator cover 33 can be formed with a plurality of introduction holes 33d radially about the axis thereof, so as to guide external air introduced through the first external air inlet 16a through the duct 90 to the plurality of introduction holes 33d of the generator cover 33. The outlet part 32b of the generator 32 can be placed so as to face the outlet 17b of the rear panel 17 to guide the external air introduced from the first external air inlet 16a to the generator 32 through the duct 90 and, after passing it over the generator 32, to release it out of the soundproof case K from the outlet 40k of the exhaust part 32b through the outlet 17b.

Next, the constitution of the soundproof type engine generator 10 is described in reference to FIGS. 13 to 21. The soundproof type engine generator 10 can have the generator 32 and the engine 31 placed side by side in the soundproof case K. The rotary shaft 46 of the generator 32 and the crankshaft 41 of the engine 31 can be interconnected on the same axis for interlocked rotation. While the rotary shaft 46 of the generator 32 and the crankshaft 41 of the engine 31 are formed integrally in this embodiment, the rotary shaft 46 and the crankshaft 41 may be separately formed and interconnected.

The engine 31 used here is an air-cooled, single cylinder, four-stroke cycle engine. The engine body 31a can be integrally cast with a cylinder body part 31a1 and a crankcase part 31a2 on one side. An integrally cast crankcase 40 is fit to the crankcase part 31a2. A crankshaft 41 is supported through bearings 91a, 91b on the crankcase part 31a2 and the crankcase 40. A piston 50 is provided for reciprocal motion in the cylinder body part 31a1. The piston pin 51 provided in the piston 50 and the crankshaft 41 are interconnected through a connecting rod 52. As the piston 50 reciprocates, the crankshaft 41 is rotated through the connecting rod 52. Lubricant oil 87 can be stored in a crankcase 86 defined with the engine body 31a and the crankcase 40. The level of lubricant oil 87 can be detected with a level sensor 88.

A cylinder head 53 is attached to the cylinder body part 31a1. A combustion chamber 54 is defined as a space surrounded with the inner wall 31a3 of the cylinder body part 31a1, the head part 50a of the piston 50, and the recess 53a of the cylinder head 53. The cylinder body part 31a1 and the cylinder head 53 are respectively provided with fins 31a6, 53b. The cylinder head 53 is formed with an intake port 55 and an exhaust port 56, open to the combustion chamber 54. Both the ports are opened and closed with an intake valve 58 and an exhaust valve 59 according to appropriate timing. An intake pipe 37 is connected to the intake port 55. An exhaust pipe 38 is connected to the exhaust port 56.

The exhaust case 60 is made up of a cover part 60a, lower case part 60b, and an upper case part 60c. The cover part 60a can be placed on part of the lower case part 60b covering the exhaust pipe 38. The lower case part 60b is connected to the exhaust side of the cylinder body part 31a1. The lower case part 60b can be secured together with the cover part 60a to the cylinder body part 31a1 by tightening bolts 61 in three positions. The lower end of the lower case part 60b is placed on the upper end of the lower part 60a. The lower end of the upper case part 60c is placed on the upper end of the lower case part 60b and secured by tightening bolts 63.

The exhaust case 60 and the silencer 45 can be placed above the engine 31. The silencer 45 can be placed in a space 61 formed with the lower case part 60b and the upper case part 60c. A crank 68 for guiding air to the space 61 is formed between the cylinder body part 31a1 and the silencer 45. After cooling the engine 31 air flows through the air feed passage 68 to cool the silencer 45 when flowing through the space 61 formed between the silencer 45 and discharged through an exhaust opening 60d formed with the lower case part 60b and the upper case part 60c. The exhaust pipe outlet 45c of the silencer 45 can face the outlet 17a of the rear panel 17. The exhaust opening 60d formed with the lower case part 60b and the upper case part 60c can face the outlet 17b of the rear panel 17. Exhaust gas can be released out of the outlet 17a. Cooled air is released out of the outlet 17b.

One end of the crankshaft 41 projects out of the engine body 31a of the engine 31 and extends toward the right side cover 15. A rotor 42 of a flywheel magneto 43 can be fit over the end of the crankshaft 41 using a key 43a and secured by tightening a nut 43b. A magnet 42a for detecting the ignition time point can be attached on the periphery of the rotor 42. A coil 42b for detecting the ignition time point is provided to face the magnet 42a. A plurality of second fans 34 for suctioning air can be formed integrally with the fore-end side of the rotor 42.

A disk 39 having cogs 39a can be secured to the rotor 42. The engine starts as the disk 39 is driven with a starter motor 94 to rotate. The flywheel magneto 43, etc. are surrounded with a fan cover 44 extending about the axis of the crankshaft 41. A plurality of air guide holes 44b can be formed with the fan cover 44 and a cover cap 44a. The fan cover 44 can be made from a formed metallic sheet, for example. The plural number of air guide holes 44b can be formed by gaps produced between the air inlet 44c of the fan cover 44 and the cover cap 44a attached to the fan cover 44 using screws 44d. The gap produced with the plurality of air introduction holes 44b is formed as the attachment shaft part 44a1 of the cover cap 44a has a specified length in the axial direction.

As the crankshaft 41 is rotated by the operation of the soundproof type engine generator 10, external air introduced from the second external air inlet 15a is guided with the second fan 34 from the plurality of air guide holes 44b through the air introduction hole 44c of the fan cover 44 to the engine 31. This air is used to cool the engine 31. After that, the air is guided from the cylinder body 31a1 through the exhaust case 60 to an air passage 68, to flow into the space 61 formed between the silencer 45 and, after cooling the silencer 45, discharged out of the soundproof case K.

The generator 32 is provided on a rotary shaft 46 which can be integral with the other end of the crankshaft 41 projecting out of the crankcase 40 of the engine 31 and extending toward the left side cover 16, to generate electricity by the rotation of the rotary shaft 46. In other words, the opening part 33a of the generator cover 33 is placed on the generator side opening 40a of the crankcase 40 and secured by tightening bolts 151. An attachment opening 33b is formed in the central part on the left side cover 16 side of the generator cover 33. The attachment opening 33b can be closed by fitting a cap 33c after attaching the generator 32 to the rotary shaft 46. A plurality of air introduction holes 33d can be formed radially about the attachment opening 33b on the left side cover 16 side of the generator cover 33.

To the rotary shaft 46 can be attached the first fan 77 and a fixed shaft 49, in that order, and secured by tightening a nut 70 on the fore-end. A rotor 71 of a quasi-cylindrical shape with its left side cover 16 side open is rivet-secured to the flange part 49a of the fixed shaft 49. A plurality of magnets 72a can be attached to the inside round surface of the rotor 71. A stator 73 having a core 73b with a coil 73a wound thereon is placed on the inner circumferential side of the magnets 72a. The core 73b can be attached to the left side cover 16 side of the generator cover 33 using bolts 75. Along with the rotation of the crankshaft 41, the rotary shaft 46 rotates. As the magnets 72a rotate around the coil 73a, electromotive force is produced in the coil 73a to generate electricity.

A fan chamber 76 is formed with the generator side opening 40a of the crankcase 40 and the opening 33a of the generator cover 33. The first fan 77 is placed in the fan chamber 76. The first fan 77 can have a disk-like defining plane part 77a, and a plurality of first blades 77b and a plurality of second blades 77c respectively provided radially on head and tail sides of the defining plane part 77a. The defining plane part 77a of the first fan 77 can be secured by tightening its base part 77a1 using a bolt 78 to the flange part 49a of the fixed shaft 49, so that the first fan 77 rotates together with the rotary shaft 46.

The crankcase 40 has an attachment hole part 40b for passing and attaching the crankshaft 41. An opening 40c surrounding the attachment hole part 40b is formed in the side wall on the engine side of the crankcase 40. The crankcase 40 is formed by bringing the mating face 40c1 of the engine side opening 40c into contact with the mating faces 31a11, 31a21 formed on the cylinder body part 31a1 and the crankcase part 31a2, respectively, and tightening them together using bolts 79. The crankcase 40 is constituted with a pair of air feed passages 40d with their inlets 40d1 open downward and with their outlets 40d2 open toward the fan chamber 76. The crankcase 40 can be secured by bringing the mating face 40a1 of the generator side opening 40a into contact with the mating faces 33a1 formed at the opening 33a of the generator cover 33, and tightening them together using bolts 151.

The crankcase 40 can also have an integrally formed rib 40e rising from the generator side opening 40a to surround part of the engine side opening 40c. A metallic plate 40g can be secured to a boss part 40i inside the rib 40e by tightening screws 40h into the boss part 40i to form an air feed passage 40f. The inlet 40f1 of the air feed passage 40f is open toward the engine. The outlet 40f2 is open toward the fan chamber 76. In this way, as the crankcase 40 is provided with a pair of air feed passages 40d in the lower part and with the air feed passage 40f in the upper part, at least part of the air feed passages is formed in the crankcase 40. As air passes through the air feed passages, the crankcase 40 is effectively cooled. As air is suctioned through the air inlet, air flow occurs along the surface of the crankcase, at least one of upper and lower parts of the crankcase is cooled. As a result, also lubricant oil 87 in the crankcase 86 is effectively cooled.

The opening 33a of the generator cover 33 is formed with an outlet part 33j. The generator side opening 40a of the crankcase 40 is formed with an outlet part 40j. The outlet part 33j and the outlet part 40j are joined to form an outlet 40k which can face the outlet 17b made up of slit-like outlet holes in the rear panel 17.

Figure 15:
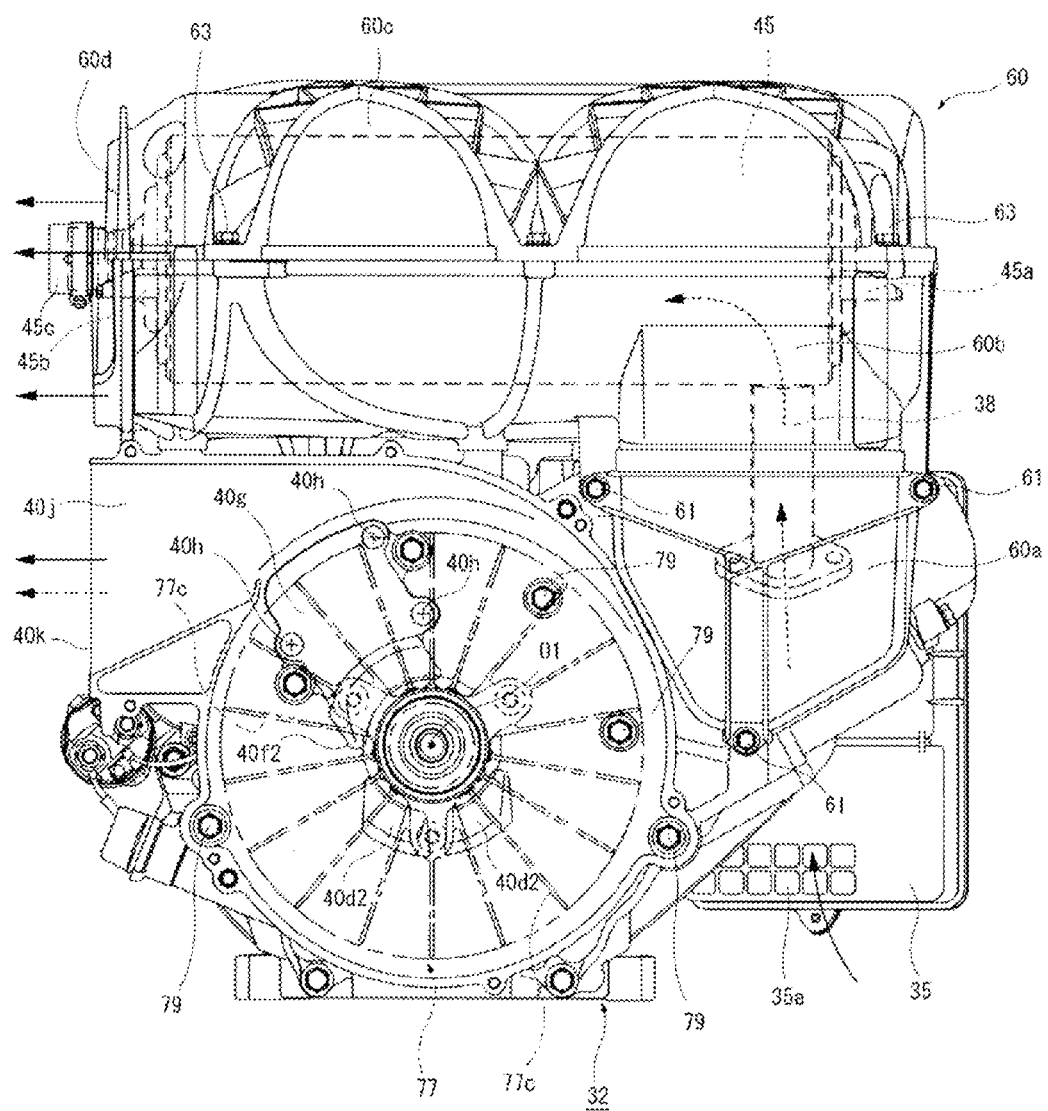
FIG. 15 is a schematic side view of the engine, with the generator removed, as seen from the generator attachment side.
Figure 16:
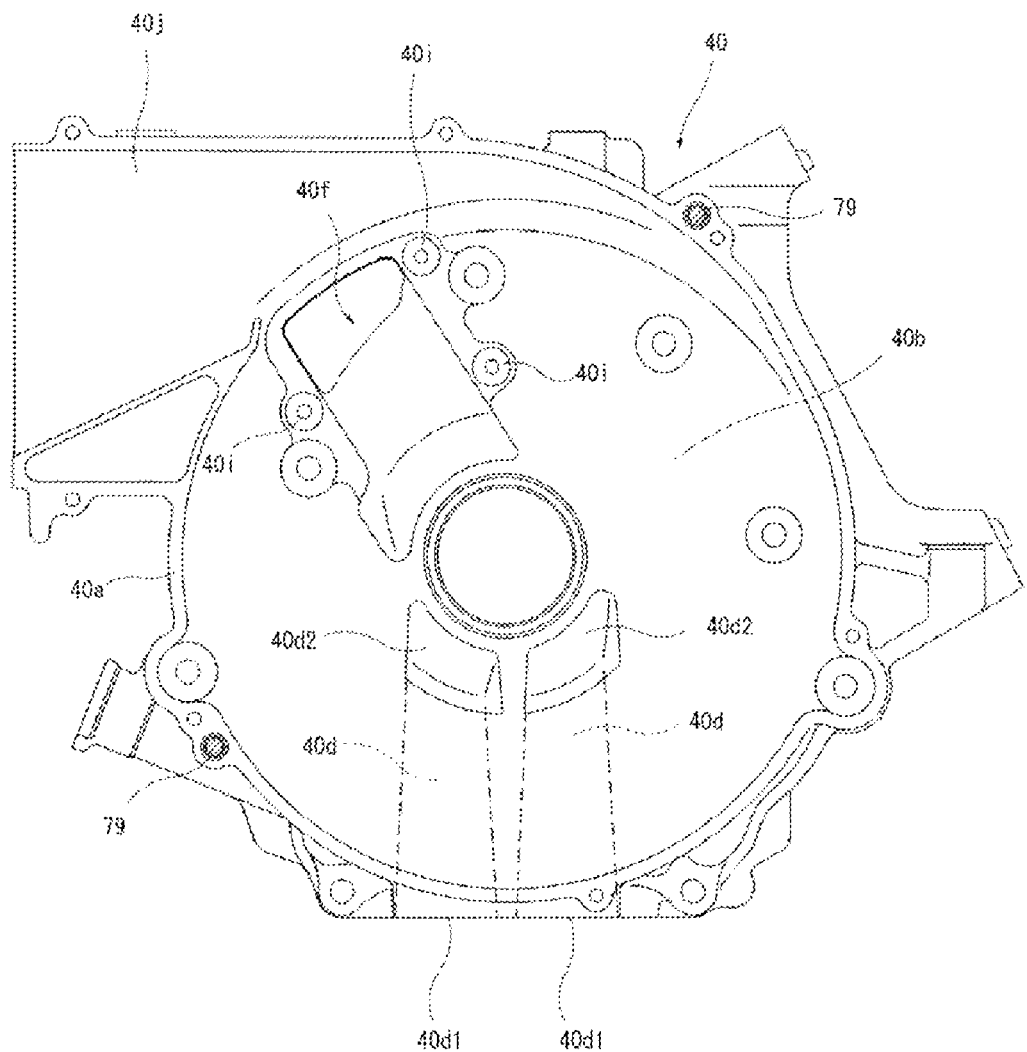
FIG. 16 is a schematic view of the first fan case as seen from the generator side.
Figure 17:
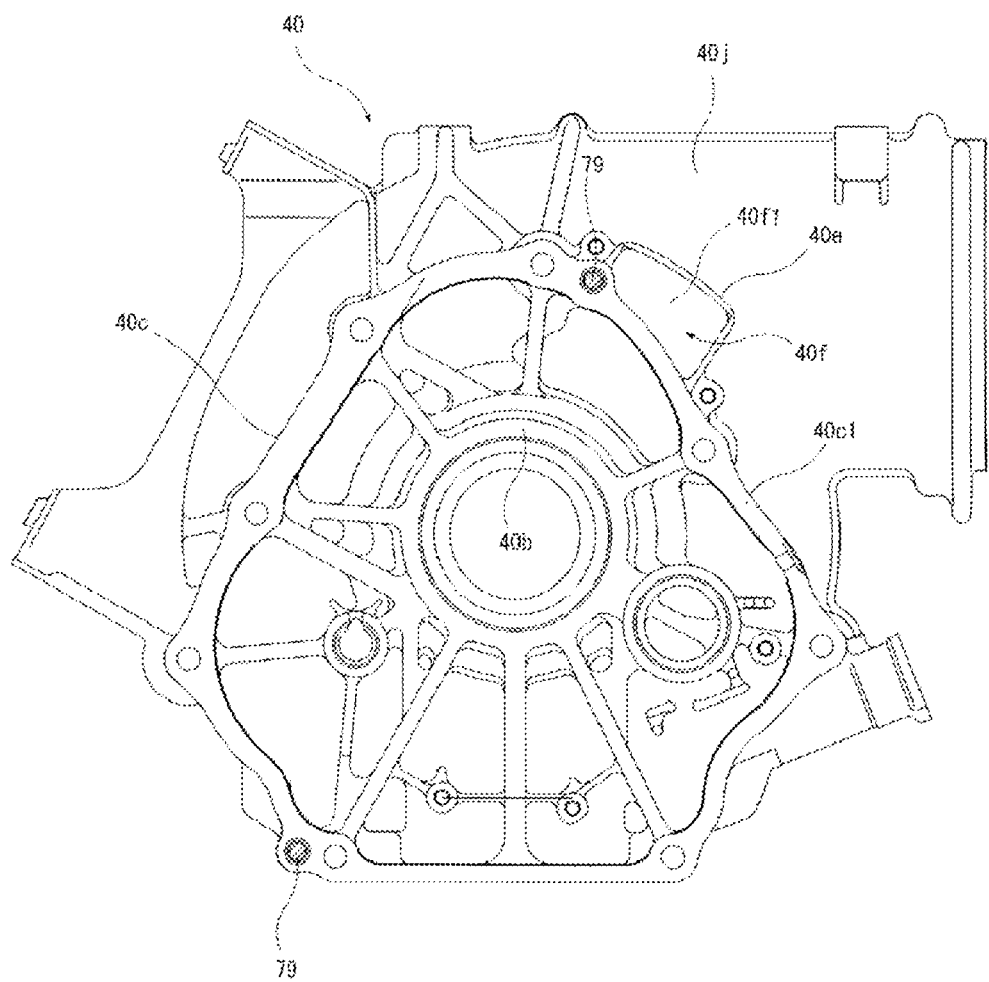
FIG. 17 is a schematic view of the first fan case as seen from the engine side.
Figure 18:
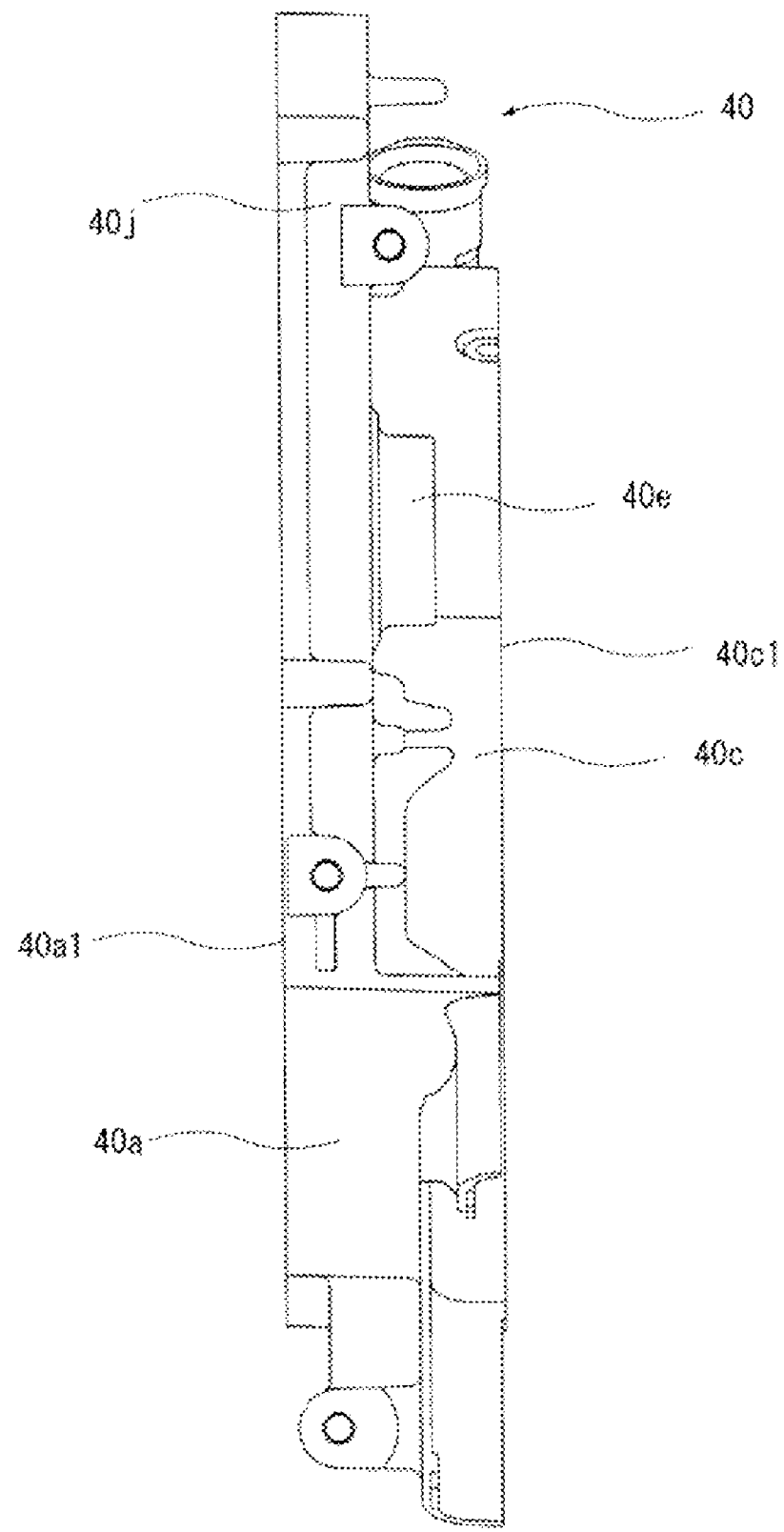
FIG. 18 is a schematic front elevation view of the first fan case.
Figure 19:
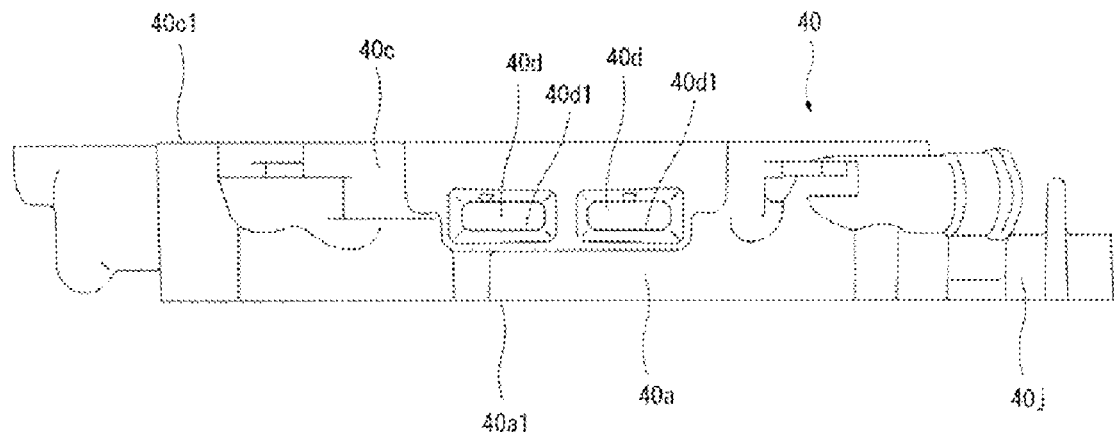
FIG. 19 is a schematic view as seen from under the first fan case.
Figure 20:
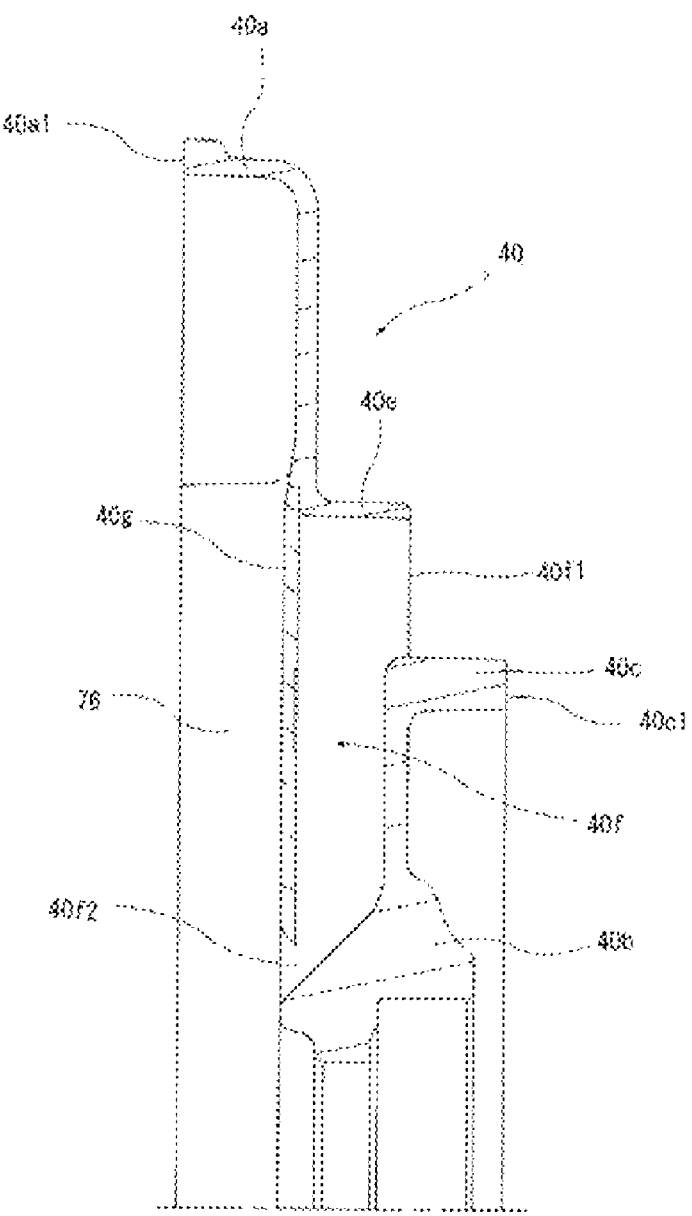
FIG. 20 is a partial, sectional schematic view of the first fan case.
Figure 21:
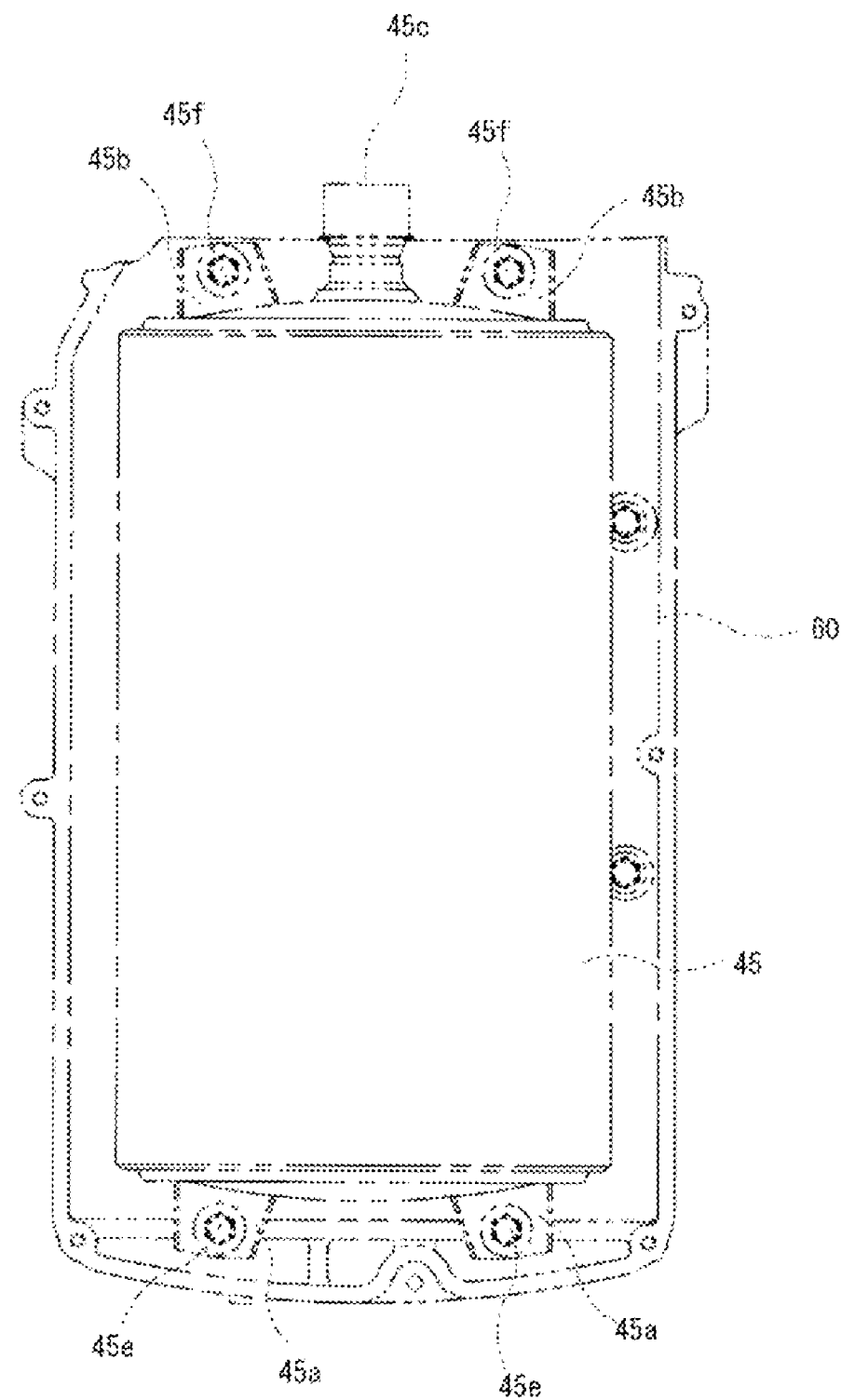
FIG. 21 is a schematic top plan view of a silencer.

In the soundproof type engine generator 10, the first fan 77 is placed between the generator 32 and the engine 31. The plurality of first blades 77b of the first fan 77 is placed so as to face the generator 32. As shown in FIG. 12, the plurality of first blades 77b are formed radially at approximately equal intervals about the axis O1 of the crankshaft 41. The plurality of second blades 77c of the first fan 77 are placed so as to face the engine 31. As shown in FIG. 15, the plurality of second blades 77c are formed radially at approximately equal intervals about the axis O1 of the crankshaft 41. The plurality of second blades 77c are placed between the engine 31 and the plurality of first blades 77b.

The soundproof type engine generator 10 has a first cooling passage A and a second cooling passage B. The first cooling passage A guides external air introduced through the first external air inlet 16a of the left side cover 16 by the rotation of the first fan 77 through the duct 90 and the generator cover 33 to the first fan 77, to the generator 32, and out of the soundproof case K. The second cooling passage B guides external air introduced through the second external air inlet 15a of the right side cover 15 to the engine 31 with the second fan 34, and out of the soundproof case K. The flow of air through the first cooling passage A is indicated with the solid line, and the flow of air through the second cooling passage B is indicated with the dash-and-double-dotted line.

The first fan 77 has a disk-like defining plane part 77a, a plurality of first blades 77b and a plurality of second blades 77c respectively provided radially on head and tail sides of the defining plane part 77a. External air introduced through the first external air inlet 16a with the plurality of first blades 77b is guided through the duct 90, to the generator 32, and out of the soundproof case K. Air in the soundproof case K is fed through the outlet 40k out of the soundproof case K with the plurality of second blades 77c. The plurality of first blades 77b, the plurality of second blades 77c, and the disk-like defining plane part 77a, of the first fan 77 can be formed as a single member of resin material, so that the number of pars is reduced, thereby reducing the cost.

The first fan 77 is placed between the generator 32 and the engine 31. The plurality of first blades 77b of the first fan 77 are placed so as to face the generator 32, while the plurality of second blades 77c of the first fan 77 are placed so as to face the engine 31. The plurality of second blades 77c are placed between the engine 31 and the plurality of first blades 77b to introduce air in the soundproof case K through the air feed passages 40d, 40f to the plural number of second blades 77c. In this way, while the air feed passages 40d, 40f for guiding air in the soundproof case K into the air feed passages 40d, 40f are provided in the vicinity of upper and lower parts of the crankcase 86 of the engine 31, the air inlet may be provided in the vicinity of at least one of upper and lower parts.

The outlet 17b can be open at the rear panel 17 of the soundproof case K. Two air streams fed respectively with the first blades 77b and the second blades 77c of the first fan 77 are brought together in the other radial vicinity of the first fan 77. Both the air streams in the state of being brought together are discharged through the outlet 40k and through the outlet 17b out of the soundproof case K.

The first external air inlet 16a is provided on the generator side face in the crankshaft direction of the soundproof case K. The second external air inlet 15a is provided on the engine side face in the crankshaft direction of the soundproof case K. A gap C in communication with the space inside of the soundproof case K is provided between the second external air inlet 15a and the second fan 34. Electric components F, such as the controller 3, the battery 2, etc. can be placed in the middle of an air passage D extending from the second external air inlet 15a to the second fan 34 of the suction fan part 31d in the gap C. As for the crankcase 40, a pair of air feed passages 40d are formed in a lower position, and air feed passage 40f is formed in an upper position. Air inlets 40d1, 40f1 for introducing air into the air feed passages 40d, 40f are formed in the vicinity of upper and lower parts of the crankcase 86 of the engine 31. As a result, the air inlets 40$d$1, 40$f$1 are provided in the vicinity of the second blades 77$c$ of the first fan 77.

The soundproof type engine generator 10 has a first cooling passage A and a second cooling passage B. The first cooling passage A guides external air introduced through the first external air inlet 16$a$ to the first fan 77, to the generator 32, and out of the soundproof case K. The second cooling passage B guides external air introduced through the second external air inlet 15$a$ to the engine 31 with the second fan 34, and out of the soundproof case K. Therefore, external air can be introduced separately to the generator 32 and the engine 31, so that the generator is cooled effectively. In other words, the first fan 77 rotates along with the operation of the soundproof type engine generator 10. The first fan 77 has the plurality of first blades 77$b$ and second blades 77$c$. External air introduced through the first external air inlet 16$a$ is guided with the plurality of first blades 77$b$ through the first cooling passage A to the generator 32, and released out of the soundproof case K. At the same time, as the air in the soundproof case K is drawn out of the soundproof case K with the plurality of second blades 77$c$ for drawing out the warmed-up air in the soundproof case K, the interior of the soundproof case K is effectively cooled. Further, as the first fan 77$b$ for cooling the generator 32 and the second fan 77$c$ for discharging air in the soundproof case K are respectively formed on both head and tail sides of the disk-like defining plane part 77$a$, the constitution of the air feed passage via the layout and attachment constitution of the fan is simplified in comparison with the case in which the fans are provided separately.

The rotor 71 of the generator 32 is formed in a barrel-like shape. The opening of the generator attachment part 90$b$ on one end of the duct 90 can be placed so as to face the generator cover 33 on the open side of the barrel-shaped rotor 71. The plurality of first blades 77$b$ can be placed near the outside face of the bottom of the barrel-shaped rotor 71. The bottom of the rotor 71 is provided with a plurality of air guiding holes 71$a$. By the air guiding effect of the plurality of first blades 77$b$, the external air entering through the first external air inlet 16$a$ flows through the duct 90 and through the plurality of air inlet holes 33$d$ of the generator cover 33 into the rotor 71, further through the air guiding hole 71$a$ and over the rotor 71, to cool the generator 32.

The first fan 77 is placed between the generator 32 and the engine 31. The plurality of first blades 77$b$ of the first fan 77 can be placed so as to face the generator 32, while the plurality of second blades 77$c$ of the first fan 77 can be placed so as to face the engine 31. The plurality of second blades 77$c$ can be placed between the engine 31 and the plurality of first blades 77$b$ to introduce air in the soundproof case K through the air feed passages 40$d$, 40$f$ to the plurality of second blades 77$c$. Further, air inlets 40$d$1, 40$f$1 for introducing air into the air feed passages 40$d$, 40$f$ are formed in the vicinity of upper and lower parts of the crankcase 86 of the engine 31. As air flows in through the air inlets 40$d$1, 40$f$1, an air flow occurs along the surfaces of the engine body 31$a$ and the crankcase 40 to cool upper and lower surfaces of the crankcase 40. As a result, lubricant oil 87 in the crankcase 86 is effectively cooled. As the air feed passages 40$d$, 40$f$ are formed in the crankcase 40, the crankcase 40 is cooled effectively when air passes through the air feed passages 40$d$, 40$f$. As a result, lubricant oil 87 in the crankcase 86 is effectively cooled. Incidentally, while the air in the soundproof case K is guided to the plurality of second blades 77$c$ through the air feed passages 40$d$, 40$f$, in another embodiment, air can be guided through one of the air feed passages 40$d$, 40$f$.

The outlet 17$b$ can be made open at the soundproof case K. Two air streams fed respectively with the first blades 77$b$ and the second blades 77$c$ of the first fan 77 are brought together in the other radial vicinity of radius outside of the first fan 77. The combined air streams can be discharged out of the soundproof case through the outlet 17$b$. Therefore, in comparison with the case in which respective air streams are fed with the first blades and the second blades, and discharged through separate passages, air is discharged faster and farther. At the same time, the exhaust constitution can be simplified.

The first external air inlet 16$a$ is provided on the generator side face in the crankshaft direction of the soundproof case K. The second external air inlet 15$a$ is provided on the engine side face in the crankshaft direction of the soundproof case K. A gap C in communication with the space inside of the soundproof case K is provided between the second external air inlet 15$a$ and the second fan 34. Electric components F, such as the controller 3, the battery 2, etc. can be placed in the middle of an external air passage D extending from the second external air inlet 15$a$ to the second fan 34 of the suction fan part 31$d$ in the gap C. Air inlets 40$d$1, 40$f$1 for introducing air in the soundproof case K into the air feed passages 40$d$, 40$f$ are formed in the vicinity of upper and lower parts of the crankcase 86 of the engine 31. Air is suctioned through the air inlets 40$d$1, 40$f$1 near the second blades 77$c$. Part of the external air introduced through the second external air inlet 15$a$ is suctioned through the air inlets 40$d$1, 40$f$1 and the external air introduced from the second external air inlet flows along the crankcase surface over a wide range of the crankcase. Therefore, the electric components F such as the controller 3, the battery 2, etc. are effectively cooled with the air flowing through the external air passage D and the crankcase is cooled effectively. As a result, lubricant oil in the crankcase is also cooled effectively.

While the soundproof type engine generator 10 is in operation, external air is suctioned through the suction holes E provided in the lower part and the front part of the soundproof type engine generator 10 by the operation of the second fan 34 of the suction fan part 31$d$. The suctioned external air flows as cooling air to the external air passage D to cool the engine 31. As the air inlets 40$d$1, 40$f$1 are provided in the vicinity of the second blades 77$c$, part of the external air is suctioned through the air inlets 40$d$1, 40$f$1, and flows from the engine body 31$a$ along the surface of the crankcase 40 over a wide area of the crankcase 40. Therefore, the crankcase 40 is effectively cooled. As a result, also lubricant oil 87 in the crankcase 86 is effectively cooled.

Further details on a sound proof type engine generator are provided in U.S. application Ser. No. 11/775,838, filed Jul. 10, 2007, the entire contents of which are hereby incorporated by reference and should be considered as part of this specification.

Although these inventions have been disclosed in the context of a certain preferred embodiments and examples, it will be understood by those skilled in the art that the present inventions extend beyond the specifically disclosed embodiments to other alternative embodiments and/or uses of the inventions and obvious modifications and equivalents thereof. For example, though certain materials have been identified in the preferred embodiments disclosed above, one of ordinary skill in the art will recognize that other suitable materials can also be used. In addition, while a number of variations of the inventions have been shown and described in detail, other modifications, which are within the scope of the inventions, will be readily apparent to those of skill in the art based upon this disclosure. It is also contemplated that various combinations or subcombinations of the specific features and aspects of the embodiments may be made and still fall within one or more of the inventions. Accordingly, it should be understood that various features and aspects of the disclosed embodiments can be combine with or substituted for one another in order to form varying modes of the disclosed inventions. Thus, it is intended that the scope of the present inventions herein disclosed should not be limited by the particular disclosed embodiments described above.

What is claimed is:

1. A soundproof type engine generator with a generator and an engine disposed side by side in a soundproof case, comprising:
   a first external air inlet and a second external air inlet on the soundproof case;
   a first cooling passage configured to guide external air introduced from the first external air inlet through a duct to a first fan, the first fan configured to guide the said external air to the generator, the air then discharged out of the soundproof case;
   a second cooling passage configured to guide external air introduced from the second external air inlet with a second fan to the engine, the air then discharged out of the soundproof case; and
   the first fan comprising:
      a disk-like planar part; and
      a plurality of first blades and second blades provided respectively on opposite sides of the planar part,
   wherein external air introduced into the soundproof case from the first external air inlet with the plurality of first blades is guided through the duct to the generator and then discharged out of the soundproof case, and air in the soundproof case is discharged with the plurality of second blades out of the soundproof case.

2. The soundproof type engine generator of claim 1, wherein:
   a rotary shaft of the generator and a crankshaft of the engine are disposed coaxially and connected together for interlocked rotation;
   the first fan is disposed between the generator and the engine;
   the plurality of first blades of the first fan are disposed so as to face the generator, and the plurality of second blades of the first fan are disposed so as to face the engine;
   the plurality of second blades are disposed between the engine and the plurality of first blades;
   air in the soundproof case is introduced through an air feed passage to the plurality of second blades; and
   an air inlet for introducing air in the soundproof case into the air feed passage is provided proximate at least one of the upper and lower parts of a crank chamber of the engine.

3. The soundproof type engine generator of claim 2, wherein:
   an air outlet is open at the soundproof case;
   two air streams fed respectively with the first blades and the second blades of the first fan are brought together proximate an outer radial edge of the first fan; and
   the combined air streams are discharged out of the soundproof case.

4. The soundproof type engine generator of claim 2, wherein at least part of the air feed passage is formed in a crankcase of the engine.

5. The soundproof type engine generator of claim 2, wherein:
   the first external air inlet is provided in the side face on the generator side of the soundproof case in a crankshaft direction;
   the second external air inlet is provided in the side face, on the engine side, of the soundproof case in the crankshaft direction;
   a gap in communication with a space inside of the soundproof case is provided between the second external air inlet and the second fan;
   electric components disposed in the gap in the middle of an external air passage extending from the second external air inlet to the second fan; and
   the air inlet is provided proximate the second blades.

6. A soundproof type engine generator, comprising: with a generator and an engine disposed side by side in a soundproof case, comprising:
   an internal combustion engine;
   a generator disposed adjacent the internal combustion engine;
   a substantially soundproof case configured to house at least the internal combustion engine and the generator, the soundproof case defining a first external air inlet and a second external air inlet;
   a first fan disposed between the generator and the engine, the first fan configured to draw a first external air flow through the first external air inlet and to guide the first external air flow through a first cooling passage to the generator, the first external air flow discharged out of the soundproof case; and
   a second fan disposed between the second external air inlet in the substantially soundproof case and the engine, the second fan configured to draw a second external air flow through the second external air inlet and to guide the second external air flow through a second cooling passage to the engine, the second external air flow discharged out of the soundproof case, the second cooling passage being separate from the first cooling passage.

7. The soundproof type engine generator of claim 6, wherein the first fan comprises a rotatable disk-like part and a plurality of first blades and second blades provided respectively on opposite sides of the disk-like part, external air introduced into the soundproof case from the first external air inlet with the plurality of first blades being guided through a duct to the generator and then discharged out of the soundproof case, air in the soundproof case being discharged with the plurality of second blades out of the soundproof case.

8. The soundproof type engine generator of claim 7, wherein:
   the plurality of first blades of the first fan are disposed so as to face the generator, and the plurality of second blades of the first fan are disposed so as to face the engine; and
   the plurality of second blades are disposed between the engine and the plurality of first blades.

9. The soundproof type engine generator of claim 6, wherein a rotary shaft of the generator and a crankshaft of the engine are coaxial and coupled for interlocked rotation.

10. The soundproof type engine generator of claim 9, wherein the rotary shaft of the generator and crankshaft of the engine form a unitary body.

11. The soundproof type engine generator of claim 6, wherein the first external air inlet and the second external air inlet are disposed on opposite ends of the substantially soundproof case.

12. The soundproof type engine generator of claim 6, wherein the first cooling passage and second cooling passage are configured to direct external air separately to the generator and engine, respectively, so as to effectively cool the generator and engine.

13. A method for operating a soundproof type engine generator having a generator and an engine disposed side by side in a soundproof case, comprising:

drawing a first external air flow through the soundproof case and directing said first external air flow to the generator, the first external air flow ejected out of the soundproof case; and drawing a second external air flow through the soundproof case and directing said second external air flow to the engine, the second external air flow ejected out of the soundproof case, wherein the first external air flow and second external air flow are directed separately to the generator and engine, respectively, so as to effectively cool the generator and engine.

* * * * *